(12) United States Patent
Fisse

(10) Patent No.: US 8,924,253 B2
(45) Date of Patent: Dec. 30, 2014

(54) SYSTEMS AND METHODS RELATED TO DELIVERING TARGETED ADVERTISING TO CONSUMERS

(76) Inventor: Jon Fisse, Ridgewood, NJ (US)

( * ) Notice: Subject to any disclaimer, the term of this patent is extended or adjusted under 35 U.S.C. 154(b) by 1319 days.

(21) Appl. No.: 12/169,954

(22) Filed: Jul. 9, 2008

(65) Prior Publication Data

US 2009/0018915 A1    Jan. 15, 2009

Related U.S. Application Data

(60) Provisional application No. 60/958,536, filed on Jul. 9, 2007.

(51) Int. Cl.
  *G06Q 30/00* (2012.01)
  *G06Q 30/02* (2012.01)
(52) U.S. Cl.
  CPC ............ *G06Q 30/02* (2013.01); *G06Q 30/0251* (2013.01); *G06Q 30/0269* (2013.01); *G06Q 30/0256* (2013.01); *G06Q 30/0273* (2013.01); *G06Q 30/0245* (2013.01); *G06Q 30/0275* (2013.01); *G06Q 30/0217* (2013.01)
  USPC .................................... 705/14.43; 705/14.47

(58) Field of Classification Search
  USPC .............................................. 705/14.1–17.73
  See application file for complete search history.

(56) References Cited

U.S. PATENT DOCUMENTS

| | | |
|---|---|---|
| 6,182,050 B1 | 1/2001 | Ballard |
| 6,804,659 B1 | 10/2004 | Graham et al. |
| 2001/0014868 A1 * | 8/2001 | Herz et al. ...................... 705/14 |
| 2002/0013174 A1 | 1/2002 | Murata |
| 2003/0145323 A1 | 7/2003 | Hendricks et al. |
| 2004/0249710 A1 * | 12/2004 | Smith et al. ..................... 705/14 |
| 2005/0027666 A1 * | 2/2005 | Beck et al. ........................ 707/1 |
| 2005/0086697 A1 | 4/2005 | Haseltine |
| 2006/0253328 A1 | 11/2006 | Kohli et al. |
| 2008/0319855 A1 * | 12/2008 | Stivoric et al. .................. 705/14 |

* cited by examiner

*Primary Examiner* — Greg Pollock
(74) *Attorney, Agent, or Firm* — The Webb Law Firm; Nathan J. Prepelka; Christian D. Ehuet

(57) ABSTRACT

In embodiments of the present invention improved capabilities are described for delivering targeted advertising to users. A digital ad targeting system is adapted to operate with respect to expressly provided profiles of and relating to consumers. The expressly provided profiles may include psychographic information of and relating to consumers. The system may include an application, a database, and/or an interface. Related methods are disclosed.

19 Claims, 16 Drawing Sheets

Select your Business Rules

- Length of Campaign: [2 Weeks ▼]
- Max Ads Served: [10,000]
- Daypart / Weekend: [Midday 10am-3pm ▼]
- Frequency Caps: [1 X per Weekpart ▼]

Preferred Distribution Device(s)
[computer ▼]
(multiple selections allowed)

Enable Ad Mash-Ups

Advertiser-provided Creative ☑
(multiple selections allowed)

Required or preferred web-site(s) on which ads to be placed (in the case of Atomite licensees that are third-party online ad networks) or placement location within a web-site (in case of Atomite licensee)
[Rivals.com ▼]
(multiple selections allowed)

Enable Creation of Dynamic-Customized Ad
Click here for detailed explanation of this business rule

| Product Make Modules | Product Model Modules | Product Color Modules |
|---|---|---|
| [Chevy Car ▼] | [Corvette ▼] | [Blue ▼] |
| (multiple selections allowed) | (multiple selections allowed) | (multiple selections allowed) |

Voice Over Gender Modules  Background Music Modules  Background Scenery Modules
[Male ▼]  [Pop ▼]  [Urban ▼]
(multiple selections allowed)  (multiple selections allowed)  (multiple selections allowed)

Price modules
[Full Price ▼]
(multiple selections allowed)

Ad Format Modules   Local Dealership Contact Detail Modules
[Text ▼]   If consumer profile zip code X, Y, Z then Local Dealership Contact Details 1, 2, or 3 ☑

Economic Model
[CPM ▼]
(multiple selections allowed)

Click here for Dynamic-Customized Ad Step Chart
Tightness of Fit Band & Cost per Band
Click here for detailed explanation of this business rule

| 'Tightness of Fit' Band | Fixed 'Cost per Band' Amount | Enable Dynamic Pricing Engine (DPE) | Maximum Dynamic 'Cost per Band' Amount |
|---|---|---|---|
| 95-100% | $28 | ☐ | $29 |
| 90-94.99% | $22 | ☐ | $23.50 |
| 85-89.99% | $15 | ☐ | $16.26 |
| 80-84.99% | $7.50 | ☐ | $8.30 |
| 75-79.99% | $5.25 | ☐ | $6.75 |
| 70-74.99% | $4.10 | ☐ | $4.25 |
| 65-69.99% | $2.75 | ☐ | $2.95 |
| 60-64.99% | $1.15 | ☐ | $1.23 |
| 55-59.99% | $0.90 | ☐ | $0.95 |
| 50-54.99% | $0.65 | ☐ | $0.69 |
| 45-49.99% | $0.40 | ☐ | $0.43 |
| 40-44.99% | $0.15 | ☐ | $0.17 |
| <40% | $0.00 | ☐ | $0.00 |

SYSTEMS AND METHODS RELATED TO DELIVERING TARGETED ADVERTISING TO CONSUMERS

CROSS-REFERENCE TO RELATED APPLICATIONS

This application claims the benefit of the following provisional application, which is hereby incorporated by reference in its entirety:

U.S. Provisional Patent Application No. 60/958,536, filed Jul. 9, 2007, entitled "Digital ad targeting system."

This application is related to the following commonly owned provisional application, which is hereby incorporated by reference in its entirety:

U.S. Provisional Patent Application Ser. No. 61/079,279, filed on even date herewith, entitled "Digital ad targeting system."

BACKGROUND OF THE INVENTION

Delivering time-sensitive, targeted advertising may involve acting at least in part upon a consumer's actual intentions to deliver an advertisement that is highly relevant to the consumer.

Simple registration engines, which rely on demographic targeting, may not be capable of determining a consumer's intentions or whether the consumer is intending to buy now or in the future.

Search engines may seek to derive purchasing intent based on the input of search terms. Unfortunately, such an approach may be prone to generating 'false positives' (i.e., a mismatch between a consumer's perceived and actual purchasing intentions).

Behavioral targeting engines may capture a consumer's behavior, such as Web surfing, but may neither elicit a consumer's actual purchasing intentions nor correlate those intentions with the consumer's behavior.

Contextual engines may serve ads based upon the content of a Web page or a section of a Web site but it does not necessary follow that such content is correlative to a consumer's purchasing intentions.

In general, the foregoing digital ad targeting engines may rely upon what amounts to guesstimates of actual consumer purchasing intentions. As a result, such engines may produce an ineffective, inefficient, and/or haphazard dispersal of advertising.

As a result, there remains a need for improved systems and methods deploying time-sensitive, targeted advertising that is correlated to a consumer's purchasing intentions.

SUMMARY OF THE INVENTION

Embodiments of the present invention include improved systems and methods related to deploying time-sensitive, targeted advertising that is correlated to a consumer's purchasing intentions. In embodiments advertisements may be configured, priced, delivered, and so on. In embodiments individuals are rewarded for participating, such as by receiving affinity points redeemable for meaningful compensation or the like. In embodiments a consumer may receive affinity points for answering a question; for allowing third-party data to be associated with the consumer's profile; for granting permission to share information with a third-party; for inviting a friend to create a consumer's profile; for ranking, sharing, mashing and/or clicking on and taking an advertiser-desired action with respect to an ad; and so on. In embodiments such methods and systems seek to engage customers directly, posing a series of questions that participating individuals answer about, among other things, their individual preferences and intentions. In embodiments each advertiser can develop an ideal consumer profile, to which the answers of particular individuals can be compared, so that one or more highly relevant advertisements or offers can be presented to the individual. In embodiments individuals answer a relatively short question set that is designed to produce information highly relevant to the individuals' preferences and intentions, without consuming a great deal of time. In certain embodiments individuals dispose a set of tokens over a series of sliding scale questions, so that information about preferences and intentions is obtained both for an individual question and across different questions; similarly, advertisers may dispose tokens over an ideal consumer profile of the same set of questions that are posed to the consumers, thereby facilitating close matching of the most relevant consumer to the most relevant advertisement.

It should be understood that certain components and methods described herein by specific product name encompass, where context permits, the various embodiments described throughout this disclosure and ones that would be recognized by one of ordinary skill in the art. In one aspect, a digital ad targeting system that is disclosed herein includes an application; and a database. The digital ad targeting system may include an interface. The interface may be a profiler interface. The interface may be a director interface. The interface may be a consumer dashboard interface. The interface may be a peer recommendation interface. The interface may be an ad mash-up tool interface. The interface may be an ad rank tool interface. The interface may be an ad share tool interface. The application may be a dynamic matching engine. The application may be a dynamic pricing engine. The application may be a reporting engine. The application may be an umpire. The application may be a dynamic consumer survey engine. The application may be a peer recommendation engine. The application may be a dynamic award distribution engine. The application may be a business rules engine. The application may be a dynamic ad creation engine. The database may be an advertiser database. The database may be a profile database. The database may be a questions database. The database may be a rules database. The database may store profiles of consumers. The database may store advertiser's ideal profiles. The digital ad targeting system may include an ad server. The digital ad targeting system may include a client application operatively coupled to the application.

In one aspect, a method of providing an affinity-based digital ad targeting solution that is disclosed herein includes accessing a set of responses expressly provided by a consumer in response to questions; comparing the set of responses to other sets of responses expressly provided by at least one advertiser in response to the questions, each of the other sets of responses associated with one or more advertisements; selecting, based at least in part upon a result of the comparing, one of the advertisements; and providing that advertisement to the consumer. At least one of the questions may be for psychographic profiling of the consumer. The question may relate to at least one thing selected from the group consisting of intentions, likes, dislikes, preferences, actions, and needs. The consumer in return for compensation expressly may provide the consumer responses. The responses may include a distribution of a constrained set of tokens over answers to a constrained set of questions. Comparing the responses may include applying a distance function that calculates a distance between the set of responses provided by the consumer and the other sets of responses provided by at least one advertiser. The distance function may be of a type selected from the group consisting of linear, non-linear, symmetrical, non-symmetrical, continuous, and discrete. The method may include charging a fixed fee to an advertiser, the fixed fee relating to the distance. The method may include charging a variable fee to an advertiser, the variable fee relating to the distance. The digital ad targeting system may include providing a varying amount of points to the consumer for providing at least one of the responses in the set of responses, the points redeemable for a benefit to the consumer. The other sets of responses may be ideal profiles of consumers that the advertisers would like to target. The consumer may receive affinity points for providing the set of responses.

In one aspect, a system for distributing a constrained set of tokens over answers to a constrained set of questions that is disclosed herein includes at least one user interface selected from the group consisting of a profiler and a director, the at least one user interface being adapted both to present the constrained set of questions and to receive an indication of how to distribute the tokens over answers; a questions database operatively coupled to the at least one user interface, the questions database adapted to provide the constrained set of questions to the at least one user interface; and a profile database operatively coupled to the at least one user interface, the profile database adapted both to receive a distribution of the tokens from the at least one user interface and to store the distribution. At least one of the answers may be represented on a spectrum. The function may include a non-linear distance function that specifies a number of tokens consumed for an answer relative to a neutral answer on the spectrum. The function may include a linear distance function that specifies a number of tokens consumed for an answer relative to a neutral answer on the spectrum. The function may include a non-symmetrical distance function that specifies a number of tokens consumed for an answer relative to a neutral answer on the spectrum. The function may include a symmetrical distance function that specifies a number of tokens consumed for an answer relative to a neutral answer on the spectrum. The function may include a linear and non-symmetrical distance function that specifies a number of tokens consumed for an answer relative to a neutral answer on the spectrum. The function may include a linear and symmetrical distance function that specifies a number of tokens consumed for an answer relative to a neutral answer on the spectrum.

In one aspect, a system for measuring the distance between consumer responses and advertiser responses that is disclosed herein includes a dynamic matching engine; and a profile database. The function may include a non-linear distance function that specifies a number of tokens consumed for an answer relative to a neutral answer on the spectrum. The function may include a linear distance function that specifies a number of tokens consumed for an answer relative to a neutral answer on the spectrum. The function may include a non-symmetrical distance function that specifies a number of tokens consumed for an answer relative to a neutral answer on the spectrum. The function may include a symmetrical distance function that specifies a number of tokens consumed for an answer relative to a neutral answer on the spectrum. The function may include a linear and non-symmetrical distance function that specifies a number of tokens consumed for an answer relative to a neutral answer on the spectrum. The function may include a linear and symmetrical distance function that specifies a number of tokens consumed for an answer relative to a neutral answer on the spectrum.

In one aspect, a method of providing an affinity-based digital ad targeting solution that is disclosed herein includes accessing a set of responses expressly provided by a consumer in response to questions; comparing the set of responses to other sets of responses expressly provided by at least one advertiser in response to the questions, each of the other sets of responses associated with one of a plurality of advertising campaigns, each of the advertising campaigns including at least one advertisement; ranking, based at least in part upon a result of the comparing, at least some of the advertising campaigns; and communicating an indication of the ranking. At least one of the questions may be for psychographic profiling of the consumer (as described herein or as understood by those of skill in the art). The consumer in return for compensation expressly may provide the consumer responses. The responses may include a distribution of a constrained set of tokens over answers to a constrained set of questions. Comparing the responses may include applying a distance function that calculates a distance between the responses. The distance function may be of a type selected from the group consisting of linear, non-linear, symmetrical, non-symmetrical, continuous, and discrete. The method of providing an affinity-based digital ad targeting solution may include providing a varying amount of points to the consumer for providing at least one of the responses in the set of responses, the points redeemable for a benefit to the consumer. Ranking may include considering costs associated with each of the advertising campaigns. The costs may be dynamic costs determined at auction.

In one aspect, a method of pricing advertising offers that is disclosed herein includes receiving a degree of fit; receiving prices associated with the degree of fit; selecting one of the prices; and returning the one of the prices. Selecting one of the prices may include conducting an auction determining the one of the prices. That one of the prices may be a fixed price. That one of the prices may be a floating price.

In one aspect, a method of an affinity-based digital ad targeting solution that is disclosed herein includes presenting a consumer with a constrained question set; allowing the consumer to make adjustments to a plurality of sliders, each of the sliders associated with a question in the question set; and storing the adjustments, wherein the consumer provides a psychographic profile by making the adjustments, and the plurality of sliders are constrained to allow only a limited cumulative departure from neutral answers with the question set. The method of an affinity-based digital ad targeting solution may include providing a varying amount of points to the consumer for making at least one of the adjustments, the points redeemable for a benefit to the consumer.

In one aspect, a method of pricing an advertisement that is disclosed herein includes receiving a fixed price of a first advertisement; receiving a maximum bid price of the first advertisement; receiving a second price of a second advertisement; when the second price exceeds the fixed price, conducting an auction in which a first bid is based upon (but not necessarily equal to) the maximum bid price and a second bid is based upon the second price (which itself may be a fixed price or based upon (but not necessarily equal to) a maximum bid price), the auction both determining a sale price and making a selection of one of the first advertisement and the second advertisement; and storing the sale price and the selection. At least one of the fixed price, the maximum bid price, and the second price may be associated with a fit band. The first advertisement may be a user-generated advertisement. The first advertisement may be a mashed-up advertisement. At least one of the advertisements may include an advertisement module, such as a creative advertisement module.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE DRAWINGS

The invention and the following detailed description of certain embodiments thereof may be understood by reference to the following figures:

FIG. 9 depicts a director interface.

DETAILED DESCRIPTION OF THE PRESENT INVENTION

Figure 1:
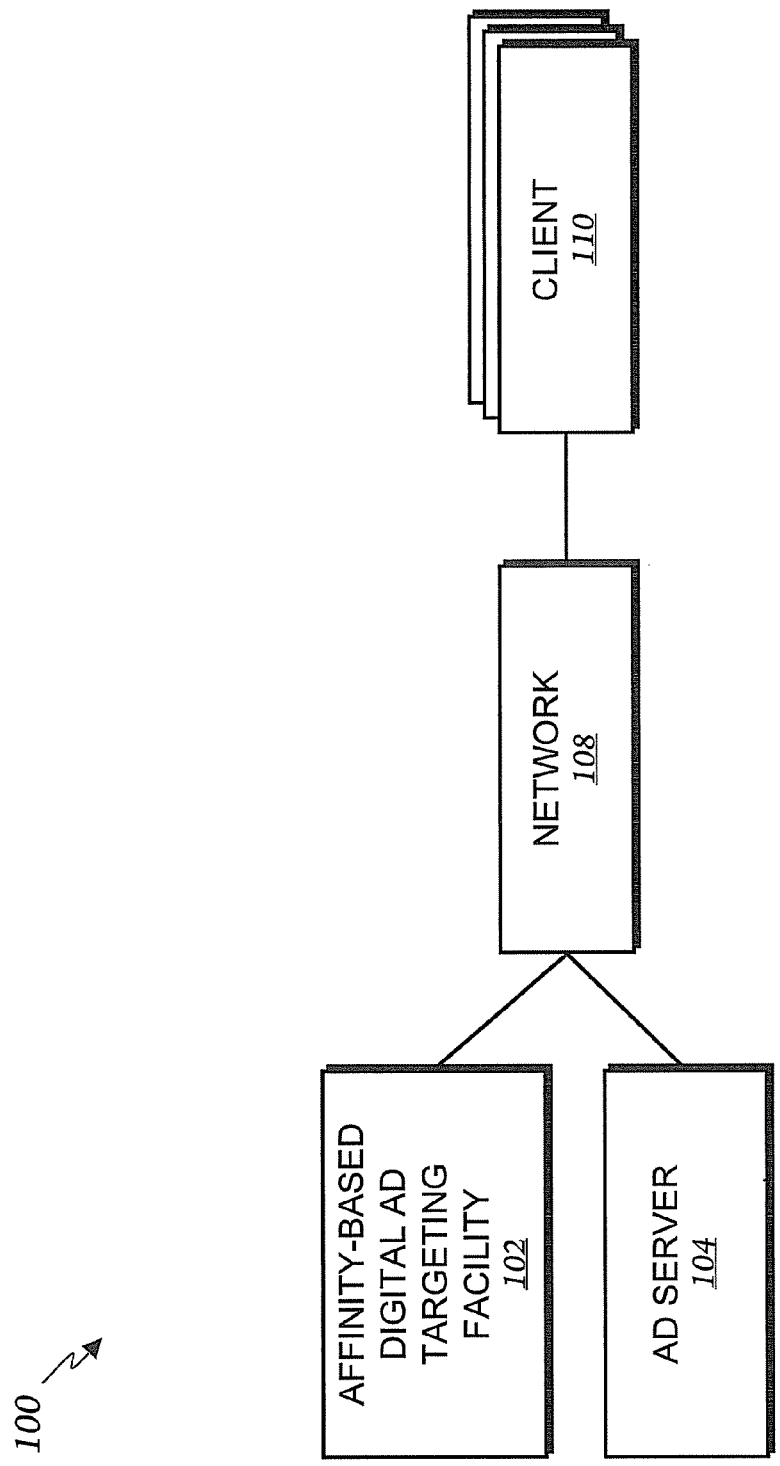
FIG. 1 depicts a network environment in supporting advertising-related activities.

Advertisers want to have an impact on consumers. In some cases a desired impact includes affecting consumer behavior, such as driving or influencing buying decisions or engaging in a positive manner with the advertiser's brand. Advertisers are constrained by, inter alia, limited advertising budgets, limited consumer attention spans and limited media company ad inventories.

Media companies with advertising inventory generate income by selling the inventory according to a rate card or the equivalent thereof. In certain instances, an auction acts as a kind of dynamic pricing mechanism. In any case, rates set by the rate card are related in material part to the media company's ability to deliver ads to desirable consumers. As a result, more effective targeting of advertisements to consumers can increase a media company's ability to generate income.

What makes a consumer desirable for one advertiser may make the consumer undesirable for another. Therefore, the more one knows about a consumer the better one may be able to target advertising to the consumer.

To some extent, it may be possible to deduce knowledge of a consumer by observing the consumer's behaviors. These behaviors might be compared to the behaviors of other users in order to deduce further knowledge.

Better yet, rather than derive "guesstimates" about a consumer's preferences, which by their nature are subject to false positives or negatives, one may wish, with appropriate consent, to get into a consumer's head—to know, anticipate, or at least have a strong sense of what the user will like, dislike, do, not do, buy not buy, prefer, not prefer, and/or intend or not intend, among other things. In other words, one may wish to have a psychographic profile of the user.

With a psychographic profile of the user, it may be possible to target advertisements to a consumer with a higher level of precision than could otherwise be attained. Moreover, with a psychographic profile it may be possible to price an advertisement based upon the degree to which the user's psychographic profile matches an "ideal" psychographic profile associated with consumers whom the advertiser is looking to attract with a particular ad campaign. Preferred embodiments of the present invention may utilize a psychographic profile to achieve these and other results that are of material benefit to consumers, producers and advertisers.

A psychographic profile of a consumer may to some limited extent be understood from observing a consumer's behavior. In preferred embodiments of the present invention, however, directly querying the consumer and obtaining express responses from the consumer may result in attainment of an improved psychographic profile, provided that the consumer's responses to queries are suitably constrained and validated for accuracy as described herein and elsewhere. The improved psychographic profile may include responses that indicate a consumer's likes and dislikes (such as preferences as to brands, colors, sizes, materials, performance characteristics, styles of advertisement, modes of interaction), intentions (such as intention to purchase particular goods or services, the intention to shop for particular goods or services, the intention to visit a particular destination (real or online), or the like), needs (such as the need for a particular product or service, the need for a particular interaction, or the like), opinions (such as the degree to which the consumer agrees or disagrees with particular statements) and other psychographic information. Similarly, an "ideal" psychographic profile may result from considering what type of consumer (that is, having what psychographic profile) should most strongly respond (or by empirical evidence is found to most strongly respond) to an advertisement of a particular type for a particular product or service (or set thereof). In some embodiments, an advertiser may specify the ideal psychographic profile that is associated with a particular ad campaign.

In order to create and maintain a psychographic profile, embodiments of the present invention may put one or more sets of questions to a user. Associated with each of the questions may be an answer spectrum having a range of answers including two opposite extreme answers and at least one moderate answer between the extremes. The user may be given a finite number of tokens or the like that are consumed as the user provides answers. A function may determine how many tokens are (i) consumed for a particular answer and (ii) thereafter remain available for consumption in connection with succeeding questions. According to the function, one answer may consume more or fewer tokens than another answer. In any case, the user's answers to the questions may be stored as the psychographic profile, or a part thereof.

In preferred embodiments, the questions may be selected for the purpose of psychographic profiling; questions within one set may be related to one another; and questions in a later set may be selected in response to earlier answers. In some embodiments, correlation coefficients between and among questions may enable adjustment of the questions in the later set as a function of the earlier answers. In some embodiments, such an adjustment may be directed at providing questions most likely to reveal or corroborate psychographic information about the user, given what is already known about the consumer. It will be understood that a variety of systems and methods for selecting questions are possible.

In preferred embodiments: An answer on each of the spectra may be designated as a neutral answer. The function may be defined so that the number of counters, such as tokens, consumed by an answer on a spectrum is related to the distance of that answer from the neutral answer on the spectrum. The number of tokens given to the user may be insufficient for the user to answer all questions in the extreme. The user may be required to provide answers that collectively consume all the tokens. This consumption of counters or tokens supports the validity of the distance based decision engine, as the use of a finite pool of tokens provides accurate relative importance to a set of disjointed psychographic factors. By requiring a consumer or advertiser to assign tokens the system can extract relative user preference without requiring direct correlation in the form of head-to-head or pair-wise comparisons.

In some embodiments, the function may be defined so that an extreme answer may consume a different number of tokens than a moderate answer; an answer toward one extreme may consume a different number of tokens than an answer toward the other extreme; and so on. The consumption of an increasing number of tokens uses absolute value, which corresponds well to the representation of distance in a linear representation of a set of answers.

In some embodiments, a token may be visually represented as a number, a tick mark along a slider, a marble in a bin, a radio button in a set of radio buttons, a checkbox in a table of checkboxes, and so on.

Throughout this disclosure, unless otherwise explicitly stated or clear from the context, references to sliders should be understood to include sliders with tic marks, bins for marbles, sets of radio buttons, tables of checkboxes, and so on; and references to tics should be understood to include marbles, radio buttons, checkboxes and so on. Thus, although various embodiments described herein may be provided with reference to tics or sliders, a variety of alternate embodiments will be readily appreciated. Such alternate embodiments may not include tics and sliders but instead may utilize an alternative to tics and sliders such as and without limitation those just described. Generally, sliders and alternate embodiments thereof may enable a user to express intentions or preferences. It will be understood that a variety of alternatives to tics and sliders are possible.

In some embodiments, answer spectra may include a 5-star spectrum wherein an answer is specified as a number of stars between 1 and 5; an agree/disagree spectrum wherein an answer is selected from the group consisting of strongly disagree, somewhat disagree, neither agree nor disagree, somewhat agree, and strongly agree; or the like. It will be understood that a variety of answer spectra are possible.

Although preferred embodiments of the present invention employ psychographic profiling of a consumer, it will be understood that some embodiments of the present invention do not require a psychographic profile of a consumer. For example and without limitation, embodiments of the present invention may instead operate with respect to a demographic profile; a geographic profile; a hybrid profile consisting of demographic, geographic, and psychographic components; or the like.

Regardless of the type of profile employed, in some embodiments an advertisement may be associated with an ideal profile. Some embodiments of the present invention may from time to time compare the consumer's profile to an ideal profile generated by an advertiser or its representatives in order to determine how to best configure dynamic components of a particular advertisement, whether to serve a particular advertisement, how much to charge an advertiser for a particular advertisement, and so on.

It will be understood that aspects of some embodiments of the present invention may not directly relate to profiles. For example and without limitation, the following disclosure may describe how some embodiments of the present invention enable a user to create a mashed-up (that is, a blend of advertiser and consumer generated creative) advertisement irrespective of whether the advertisement is associated with a profile.

A consumer panel may include a representative consumer group whose function is to respond to consumer survey questions within a prescribed period. The consumer panel may be physical, virtual, or a combination of both. When the consumers are substantially chosen in advance and when their membership in the panel is substantially constant, the consumer panel may be referred to as a static consumer panel.

Embodiments of the present invention may provide a dynamic consumer panel including a sample of similarly representative consumers who have generated or modified consumer profiles. The dynamic consumer panel may, from time to time and more or less on demand, be created by aggregating together such consumers and their profiles.

The questions that consumers answer during the process of creating their consumer profiles may include consumer survey questions. Thus, each consumer may constitute a so-called micro-panel or panel-of-one. It will be understood that aggregating a sufficiently large sample of such consumers into a dynamic consumer panel may enable production of statistical survey results that are more or less indistinguishable from a static consumer panel.

FIG. 1 depicts a network environment supporting advertising-related activities. The environment 100 includes an affinity-based digital ad targeting facility 102, an ad server 104, a network 108, and a plurality of clients 110.

The network 108 may include any and all forms of data communications networks. In some embodiments, the network 108 may include the Internet, a mobile communications network, a wireless network, a wired network, any and all combinations of the foregoing, or the like, as well as various network-connected devices and platforms, such as televisions (such as those enabled by set-top boxes), computers, cell phones, MP3 players and web-enabled game consoles. When operatively coupled to two or more elements, the network 108 may enable data communications between those elements. It will be understood that a variety of embodiments of the network 108 are possible.

The affinity-based digital ad targeting facility 102 ("ABDAT") may be operatively coupled to the network 108. Through the network 108, the facility 102 may communicate with the ad server 104 and the clients 102. The facility 102 is described in greater detail hereinafter with reference to FIG. 2 and elsewhere.

The ad server 104 may be operatively coupled to the network 108. Under direction of the ABDAT 102, the ad server 104 may deliver advertisements to one or more of the plurality of clients 102. In some embodiments, the ad server 104 may include a web server. In some embodiments, the ad server 104 may include a worldwide network of content delivery servers. In some embodiments, the ad server 104 may exist in a separate administrative domain from the ABDAT 102. In some embodiments, the ABDAT 102 may include the ad server 104. It will be understood that a variety of embodiments of the ad server 104 are possible.

The plurality of clients 110 may be operatively coupled to the network 108. Any and all of the clients may include a processor, a communications facility for communicating via the network 108, a user interface output facility, and optionally a user interface input facility. The user interface output facility may include a display, a speaker, a vibrator, a light, any and all combination of the foregoing, or the like. The user interface input facility may include a mouse, a keyboard, a touch screen, an accelerometer, any and all combinations of the foregoing, or the like. In some embodiments, any and all of the clients 110 may include a cell phone, a computer (including without limitation desktop, laptop, server, handheld, or the like), a billboard or other advertising display, a television, an MP3 player, a game console, any and all combinations of the foregoing, or the like. In any case, any and all of the plurality of clients 110 may display an advertisement communicated from the ad server 104, display an advertisement as prompted to by the ABDAT 102, display an interface (such as and without limitation any and all of the interfaces described hereinafter and elsewhere), receive user input, communicate user input to the ABDAT 102, and so on. It will be understood that a variety of embodiments of the client 110 are possible.

Figure 2:
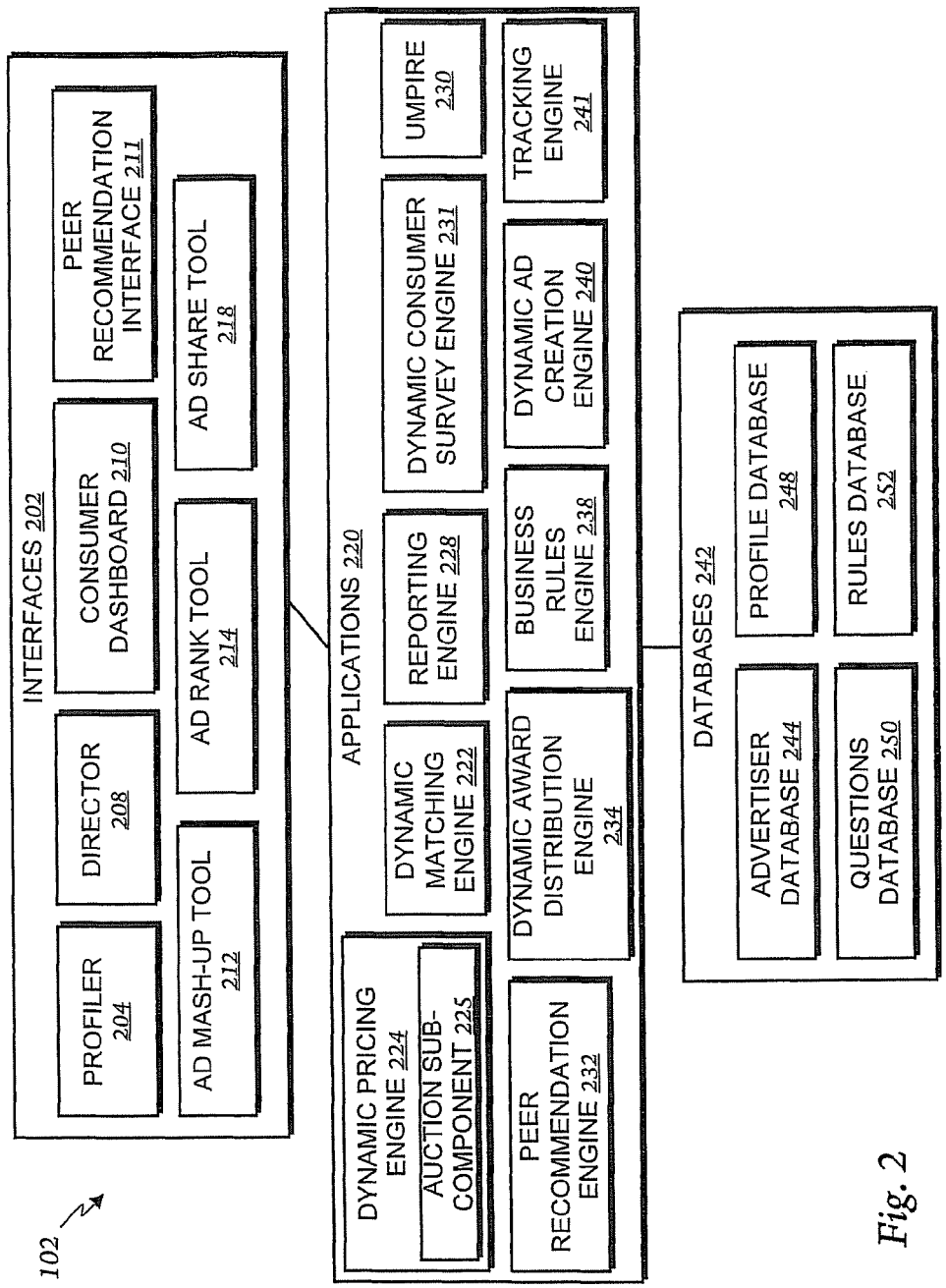
FIG. 2 depicts an affinity-based digital ad targeting facility.

FIG. 2 depicts the affinity-based digital ad targeting facility 102. The ABDAT 102 includes interfaces 202, applications 220, and databases 242. The interfaces 202 may be associated with the applications and the applications 220 may be associated with the databases 242.

The interfaces 202 include a profiler 204, a director 208, a consumer dashboard 210, a peer recommendation interface 211, an ad mash-up tool 212, an ad rank tool 214, and an ad share tool 218. The applications 220 include a dynamic matching engine 222, a dynamic pricing engine 224 (and auction sub-component 225), a reporting engine 228, an umpire 230, a dynamic consumer survey engine 231, a peer recommendation engine 232, a dynamic award distribution engine 234, a business rules engine 238, a dynamic ad creation engine 240, and a tracking engine 241. The databases 242 include an advertiser database 244, a profile database 248, a questions database 250, and a rules database 252.

Any and all of the interfaces 202 may include a computer interface provided to a user via a client 110. Generally, the interfaces 202 may solicit responses from a user; receive input or responses from a user; present information to a user; enable a user to create a mashed-up advertisement; enable a user to rank an advertisement; enable a user to share an advertisement with peers; enable a user to click on an advertisement to be brought to a series of advertiser web pages at which the consumer can take actions desired by the advertiser; enable a user to invite members of their social network to become profilers, do any and all of the foregoing; or the like.

The profiler 204, director 208, consumer dashboard 210, a peer recommendation interface 211, ad mash-up tool 212, ad rank took 214, and ad share tool 218 may be described in greater detail hereinafter with reference to FIGS. 7, 8, 9, 10, 11, and 12, respectively.

The dynamic matching engine 222 may match a consumer's profile to an ideal profile established by an advertiser and associated with one or more of such advertiser's ad campaigns. In some embodiments, this matching may occur substantially in real-time. In any case, matching may involve determining which of a plurality of ideal profiles generated by a plurality of advertisers is a closest fit to the consumer's profile.

The fit between any two profiles may be a measure of the variance between answers in the profiles, wherein both profiles contain answers to the same questions. In other words, each answer in a first profile may uniquely correspond to an answer in a second profile. The dynamic matching engine 222 may first calculate a variance between each pair of corresponding answers and then accumulate the variances between each pair to produce the measure.

Hereinafter and elsewhere, an answer in a consumer's profile may be referred to as a "consumer's answer" and an answer in an advertiser's ideal profile associated with one or more of such advertiser's ad campaigns may be referred to as an "ideal answer."

In preferred embodiments, the answers may be encoded as the number of tokens or the like that were consumed when the user provided the answer. In any case, each answer may be encoded as a number selected from a range. It follows that the variance between the consumers' and the advertisers' answers may be calculated by taking the absolute value of the difference between the answers.

When the range of answers includes positive and negative numbers, an answer may represent a degree of affinity (positive numbers) or aversion (negative numbers) with respect to a subject stated in a question. In the preferred embodiment, the variance between each pair of answers may be adjusted based on a secondary preference curve derived or defined for the advertiser when the consumer's answer is more positive than a positive ideal answer and when the consumer's answer is more negative than a negative ideal answer. The curve may, for example, reflect an advertiser's degree of preference for an answer exceeding the absolute value of the ideal score.

In preferred embodiments, the application of a curve or a function $f(x)$ may be achieved by dividing the variance which represents distance from an ideal by 2. Thus, the variance may be calculated by |consumer's answer−ideal answer|/$f(x)$, where $f(x)$ equals 2 in the case where both answers are positive and the consumer's answer is the greater; $f(x)$ equals 2 in the case where both answers are negative and the consumer's answer is the lesser, and $f(x)$ otherwise equals 1.

For example and without limitation, a dog food company may be interested in delivering an advertisement to people who care for their dogs. A pair of corresponding, answers may relate to whether and how much one cares for one's dog. The consumer's answer may indicate an extreme affinity for this subject, which may be encoded as +10. The ideal answer may indicate a modest affinity for this subject, which may be encoded as a +5. In preferred embodiments, the variance may be calculated as |10−5|/2.

In some embodiments, $f(x)$ may be any suitable function. In some embodiments, $f(x)$ may be a linear function, a non-linear function (such as a quadratic function or higher order function), a symmetrical function, a non-symmetrical function (such as a linear function with a different slope depending upon the direction from a neutral point, or a function with different curvature in different directions, such as linear in one direction and quadratic in another), a continuous function, a discrete function, and so on. In some preferred embodiments, $f(x)$ may be a function of the difference between the consumer's answer and the ideal answer. In some embodiments, $f(x)$ may be a function of any and all kinds of remote input, which may without limitation include a signal from a computer, software application, computing facility, or the like. In some embodiments, an advertiser may specify $f(x)$. In some embodiments, a user interface may enable the advertiser to specify $f(x)$ by interactively modifying its slope as depicted in a user interface, or the like. It will be understood that a variety of formulations and embodiments of $f(x)$ are possible. Moreover, it will be understood that a variety of formulas may be employed to calculate the variance and that not all such formulas may include $f(x)$. In various preferred embodiments, the function $f(x)$ may be defined by an advertiser; derived by, for example, a service provider or host on behalf of an advertiser; be derived automatically based on past results; or determined based on analysis of past results.

For the variance to capture an accurate measure of a consumer's fit to an advertiser's ideal profile, the consumer's profile must be current. In practice, however, the consumer's profile may become stale over time. For example and without limitation, a consumer who two weeks ago expressed maximum affinity for buying a truck and who last week bought a truck may still have a profile containing maximum affinity for buying a truck, even though it will now be years before the consumer buys another truck.

In order to encourage consumers to keep their profiles current—and more generally in order to entice consumers to answer questions in the first instance, to take actions that are in accord with the ABDAT 102, to take actions desired by advertisers employing the ABDAT 102, and so on—one or more incentives may be offered to consumers. In preferred embodiments, consumers may be awarded so-called affinity points in exchange for taking the actions. For example and without limitation, a consumer may receive affinity points for answering a question; for allowing third-party data to be associated with the consumer's profile; for granting permission to share information with a third-party; for inviting a friend to create a consumer's profile; for ranking, sharing, mashing and/or clicking on and taking an advertiser-desired action with respect to an ad; and so on. A variety of such examples will be understood.

In preferred embodiments, the affinity points may be redeemed for products, for priority access to products, for discounts on products, and so on. It will be understood that "products" refers to products and/or services. In embodiments, points may be redeemed for premium products/services (such as those of licensees of the host of the platform described herein). In embodiments, points may be redeemed for purchase credits that are used to reduce the purchase price of the products/services. In any case, the product may be associated with and/or supplied by advertisers, which may advertise on web sites affiliated or licensed by the host of the host platform. Thus, an ecosystem of consumers-publishers-advertisers may be established in which the consumer is provided with highly relevant/meaningful consideration in exchange for 'intention data'.

In some embodiments, the consumer may employ affinity points in lieu of cash during what would otherwise be a cash transaction. During such transactions, the points may be converted into cash-equivalents according to a conversion rate. In preferred embodiments, the conversion rate for one product may be different from the conversion rate for another product. Similarly, the conversion rate utilized by one supplier of products/services may be different from the conversion rate utilized by another supplier of products/services.

In some embodiments, a consumer's behavior and/or actions may be tracked. Results of such tracking may result in the consumer being prompted to answer more questions, prompted to update information, or the like. Moreover, results of such tracking may be employed to update the consumer's profile.

An example of such tracking, provided for the purpose of illustration and not limitation, may include a pixel embedded in a web page. The pixel may be associated with a URL, Javascript program, Flash script, or the like that contacts a remote server to report on consumer behavior and/or actions.

Another example of such tracking, also provided for the purpose of illustration and not limitation, may include a promotional code provided to a consumer and used during a transaction. The consumer may provide the promotional code to a vendor in exchange for a discount on a product. The vendor may key-in or otherwise enter the promotional code into a client 110 that communicates the promotional code to the ABDAT 102. Upon receiving such communication, the ABDAT 102 may conduct any of a number of actions. Without limitation, these actions may include prompting the consumer to refresh the consumer's profile; performing a data mining operation (such as may be conducted by an application 220); performing an ad-ranking operation that tends to increase a ranking of an advertisement associated with the promotional code (such as may be conducted by an application 220); and so on.

Tracking may be described in greater detail hereinafter with reference to the umpire 230. It will be understood that a variety of systems and methods for tracking consumer behavior and/or actions are possible.

From time to time the consumer may be prompted to update the consumer's profile. In some embodiments, updating the consumer's profile may include revising the answers in the profile. In some embodiments, updating the consumer's profile may include putting one or more new sets of questions to the consumer.

The dynamic pricing engine 224 may calculate cost-per-click (CPC), cost-per-action (CPA), or the like for an advertisement. In some embodiments, each of the CPCs, CPAs, or the like may be associated with a so-called maximum dynamic cost. In some embodiments, advertisements may be associated with a variety of CPCs, CPAs, or the like, each of which may relate to a fit band (described hereinafter). Throughout this disclosure and elsewhere, unless explicitly stated otherwise or clear from the context, the word "cost" should be interpreted to mean "a cost such as and without limitation a CPC, a CPA, or the like."

A fit band may encompass groupings of percentiles into which all consumers may be divided based upon the fit of their specific consumer profile to the ideal profile. For example, the consumer whose profile best fits the ideal profile may fall into a 95-100% fit band; the consumer whose profile least fits the ideal profile may fall into a <40% fit band; and so on.

When an advertisement is served to a consumer, the cost of the advertisement may be set to a cost (CPA, CPC, or the like) associated with the fit band into which the consumer falls. In some embodiments the cost may be a publisher-fixed cost, set by a publisher of the advertisement. In some embodiments the cost may be an advertiser-fixed cost, set by an advertiser who wishes to have the advertisement published. In some embodiments the cost may be variable or a so-called floating cost, which may be based upon one or more advertiser-specified maximum costs that are considered during an auction process or the like.

In some embodiments, different fit bands may be associated with different prices, which may be specified in a variety of ways including without limitation those ways described hereinabove and elsewhere. This may enable a publisher or a plurality of advertisers to express a variety of cost preferences in relation to different fit bands. For example and without limitation, an advertiser may be willing to pay a dynamic cost up to $20 CPC for a consumer in a 96-100% fit band; a fixed cost of $10 CPC for a consumer in a 85-95% fit band; and $0 CPC for a consumer in a <40% fit band. In some embodiments, such cost preferences may be utilized by an auction sub-component 225 of the dynamic pricing engine 224, which may be described in greater detail hereinafter and elsewhere. In some embodiments, a publisher may set a floor price below which no advertisement inventory will be sold. Generally, in preferred embodiments, the dynamic pricing engine 224 may provide a stratified pricing solution in which a tighter fit between a consumer's profile and an advertiser's ideal profile results in an advertiser paying more than it would if the fit were looser.

In some embodiments, the dynamic pricing engine 224 may include an auction sub-component 225 for setting dynamic costs via auction. In some embodiments, the auction sub-component 225 may be adapted to set the dynamic costs so as to maximize an expected return-on-investment for an advertiser; so as to maximize the likelihood that a particular advertiser's ad will be served; so as to maximize a publisher's profits; so as to establish a fair market for a publisher's advertising inventory; any and all combinations of the foregoing; and so on.

If two or more advertisements are available to be served in a publisher's advertising inventory, and a consumer's profile falls within the same fit band relative to those advertisements, then the dynamic pricing engine 224 may cue the auction sub-component 225 or the like to execute an auction to determine which advertisement will be served. In preferred embodiments, the advertisement with the highest advertiser-specified maximum cost may be delivered at a price determined by the auction. In other words, the auction may involve choosing that advertisement with the highest dynamic costs of the plurality of advertisements. In some cases, the highest specified cost may be an advertiser-fixed cost, an advertiser-specified maximum or dynamic cost, or the like. It will be understood that a variety of kinds of auctions are possible.

For example and without limitation, in cases where a plurality of advertisements is suitable for delivery to a consumer (that is, when the ideal profiles of more than one advertisement fall within the same fit band relative to a particular consumer's profile), the business rules engine 238 of the ABDAT 102 may require that the ad server 104 serve the ad among such plurality that results in the highest CPC/CPA. Therefore, in order to increase the likelihood that a particular advertiser's ad is served in this context, that advertiser may enable the auction sub-component 225 of the dynamic pricing engine 224 and specify the highest CPC/CPA it is willing to pay in such context. The auction may thereafter choose to serve that advertisement with the highest maximum CPC/CPA associated with such plurality of advertisements, whether such highest CPC/CPA is fixed, floating or otherwise, thereby maximizing the ROI of a producer's ad inventory.

The reporting engine 228 may generate reports that relate to use of the ABDAT 102. In some embodiments, the reports may include billing statements for advertisers, consumer profile data, market data, advertising performance data, and so on. In some embodiments, the reports may be stored in the databases 242, communicated to a client 110, and so on. In some embodiments, the reports, through the use of statistical (e.g., regression) analysis, may be directed at identifying trends, improved targeting of future ad campaigns, informing product development efforts, and so on. In some embodiments, the reports may contain information pertaining to how many consumers within a specified fit-band were served, rated, shared, mashed-up and/or clicked-on and engaged in certain advertiser-desired actions with respect to the advertisement, invited members of their social network to create consumer profiles, and so on. In some embodiments, the reporting engine may discern the direction and strength of correlations between and among consumer responses to consumer survey questions and a plurality of advertiser-desired consumer actions, the actions ultimately taken or not taken. It will be understood that a variety of reports are possible. Moreover, a variety of embodiments of the reports will be understood.

The umpire 230 may track events; provide fraud protection; and the like. The events may include user behaviors and/or actions (including without limitation web browsing behavior, on-line or off-line purchases, updates to the consumer's profiles; and so on). A variety of other events may be described herein and elsewhere, and still other events will be appreciated.

Fraud protection may be directed at detecting and/or preventing fraudulent accumulation or use of affinity points. In some embodiments, a consumer whose actions or inactions over a specified time period represent a statistical outlier relative to other consumers with similar profiles may be flagged as a potential fraud. In some embodiments, affinity points may not vest and become redeemable until such time as the consumer takes specified advertiser-desired actions and such actions are verified. In some embodiments, the umpire 230 may from time to time invoke a fraud-prevention rate card that requires a consumer to pay some cash for a product even when the consumer is redeeming affinity points for the product.

In some embodiments, fraud protection may involve the application of business rules. For example and without limitation, a business rule may state that employees of an operator of the ABDAT 102 may not participate in accumulating and redeeming affinity points. It will be understood that a variety of such business rules are possible.

In some embodiments, fraud protection may involve the application of warnings. For example and without limitation, a warning may be issued to a consumer whose behavior or actions appear to be fraudulent. It will be understood that a variety of such warnings are possible.

In some embodiments, fraud protection may involve barring a consumer from accumulating or redeeming affinity points; confiscating affinity points from a consumer; and so on. It will be understood that a variety of embodiments of fraud protection are possible.

Figure 15:
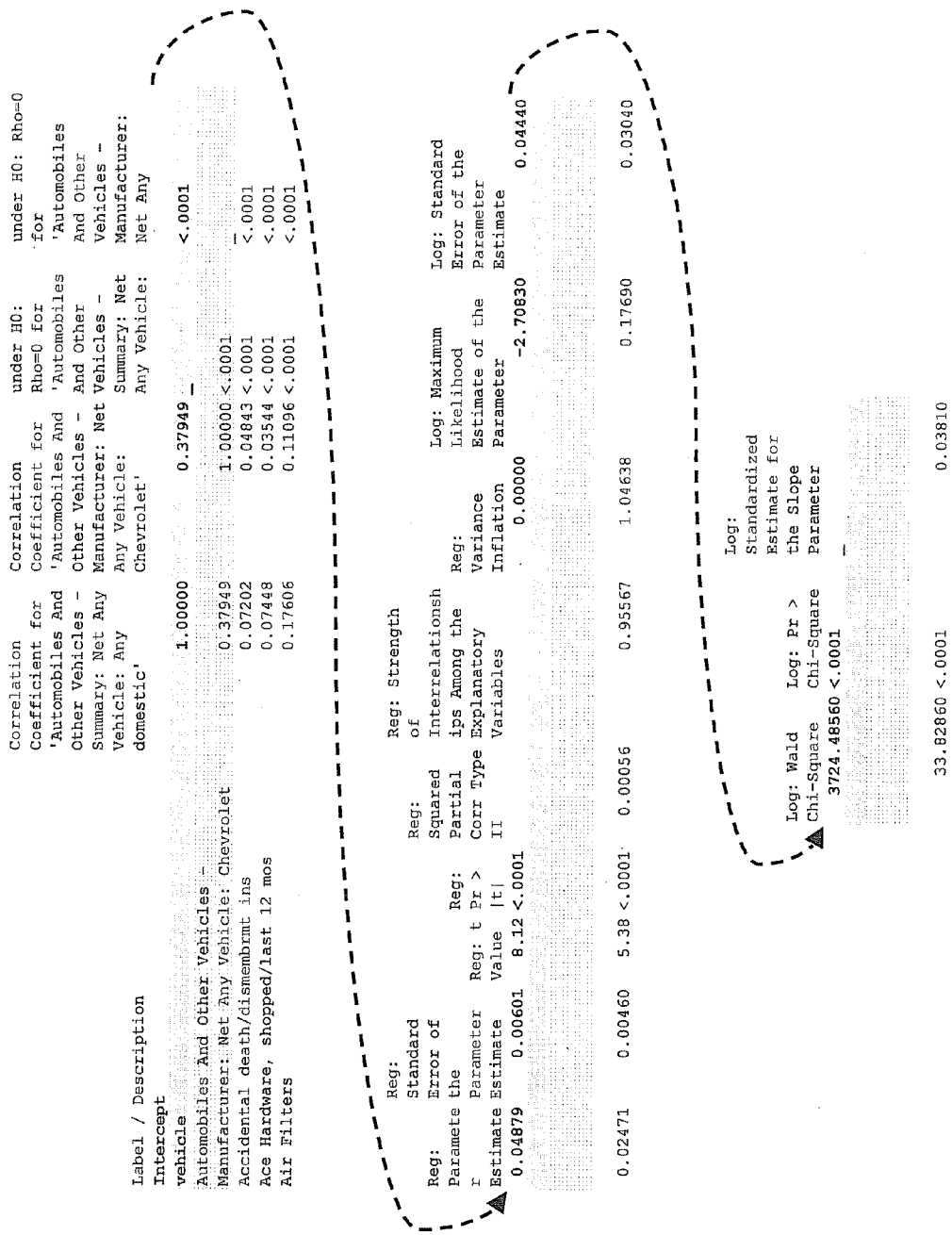
FIG. 15 depicts examples of correlation coefficients.

The dynamic consumer survey engine 231 may utilize correlation coefficients to determine relationships between and among psychographic consumer survey questions, to determine the strength of those correlations, and to determine the next set of survey questions to put to a user based upon how that user responded to preceding questions. Examples of such correlation coefficients are shown in FIG. 15. The use of correlations between and among survey questions is based on predictive and conjoint analysis. In standard conjoint analysis one scores the strength of the relationships between disjoint factors to determine an affinity for a common ideal. In a predictive model one may substitute other available factors to determine what combination gives the strongest affinity. In embodiments one may substitute other available factors, which would point to the next set of survey questions.

The peer recommendation engine 232 may receive a rating of an advertisement, the rating provided by a first consumer, and may recommend the advertisement to a second consumer having a consumer profile that more or less matches the first consumer's profile. In some embodiments, the peer recommendation engine 232 may serve an ad to the first consumer, the ad being highly rated by other consumers who possess profiles that are substantially similar to that of the first consumer.

In preferred embodiments, the peer recommendation engine 232 may receive a first rating of an advertisement and a second rating of the advertisement, the first rating provided by a first consumer and the second rating provided by a second consumer. When the first rating is similar to the second rating and the first consumer's profile is similar to the second consumer's profile, the peer recommendation engine may serve to the first user a second advertisement that is also highly rated by the second consumer.

In preferred embodiments, any and all of the ratings received by the peer recommendation engine 232 may be received from the consumers via a peer recommendation interface 211, which is described in greater detail hereinafter with reference to FIG. 14 and elsewhere.

The dynamic award distribution engine 234 may provide affinity points to a consumer for the consumer's clicking on an ad. Additionally, in some embodiments, the dynamic award distribution engine 234 may award affinity points to a consumer for the consumer's taking an advertiser-desired action. In any case, the number of affinity points provided may be correlated to the tightness of fit between such consumer's profile and such advertiser's ideal profile.

For example and without limitation: An advertiser may provide an interactive adver-game that promotes the advertiser's brand. As a consumer explores more of the game (and, thus, is exposed to more branding material), the consumer may receive more affinity points. Although the game may be open for all consumers to play, the advertiser may be particularly interested in attracting to the game consumers fitting an ideal profile. When, according to the game, it is time for a consumer to receive more affinity points, the dynamic award distribution engine 234 may be invoked to calculate the number of points to be awarded. In some embodiments, the number of points so rewarded may be in whole or in part a function of the degree of fit between a consumer's and the advertiser's ideal profile. Alternatively, before the game is invoked the dynamic award distribution engine 234 may calculate how many affinity points a consumer stands to gain by playing the game. Given a selection of games offering different quantities of affinity points the consumer may elect to play the game offering the most affinity points. In some embodiments, the different quantities of affinity points may be a function of the number of branding events embedded in each game.

Although the foregoing example describes the number of affinity points awarded as being a function of both the extent to which the consumer explores the adver-game and the consumer's fit to the ideal profile, it should be appreciated that in some embodiments the number of points awarded to a consumer may solely be a function of the consumer's fit to an ideal profile. It should also be appreciated that the number of affinity points awarded may be a function of a plurality of variables of which the consumer's fit to the ideal profile may or may not be a member. In some embodiments, one of the variables may be an amount of money that the consumer has spent on products/services. It will be appreciated that a variety of other applications of the dynamic award distribution engine 234 are possible.

The business rules engine 238 is an interface between an owner or operator of the ABDAT 102, an advertiser and the producers of web products/services or, in each case, their respective representatives, and may enforce business rules between and among such entities. A variety of business rules may be described hereinafter with reference to FIG. 9 and elsewhere, and still other business rules will be appreciated. It will be understood that a variety of systems and methods of enforcing business rules are possible.

The dynamic ad creation engine 240 may, substantially in real time, select ad creative modules as a function of a consumer's profile and then combine those modules to create an advertisement that optimizes the fit between the consumer profile and the advertiser's ideal profile. In some embodiments, the ad creative modules may be related to product makes/models/features/colors/prices, background scenery, voice over gender, music (such as and without limitation foreground music, background music, and so on), ad format, retailer contact details, and so on. It will be understood that a variety of ad creative modules are possible.

Each of the ad creative modules may be associated with all or part of an ideal profile. The dynamic ad creation engine 240 may create an advertisement by aggregating select ad creative modules together, with the objective being to select that combination of such modules that optimizes the fit between the consumer profile and the advertiser's ideal profile. For example and without limitation: An advertisement for a restaurant may include a stock photo module, a featured special module, and an address module. The stock photo module may be employed regardless of a consumer's profile. The featured special may be selected based upon a best fit to a consumer's profile, wherein at least one answer in the consumer's profile relates to the consumer's preference in food (e.g., the consumer's profile indicates a strong affinity for fish and so the dynamic ad creation engine 240 selects a fish featured special module over a steak featured special module). The address module may also be selected based upon a best fit to the consumer's profile. Here, the consumer's profile may include geographic profiling information such as the consumer's home address and so the dynamic ad creation engine 240 selects an address module associated with a restaurant address nearest the consumer's home address. In preferred embodiments, the dynamic ad creation engine 240 may operate to increase the likelihood that a particular advertiser's ad will be the best fit relative to a plurality of other advertisers' advertisements that are available to be served to a consumer. A variety of other examples will be appreciated.

The tracking engine 241 may receive a communication indicating that a consumer has responded to an advertisement. In response to the communication, the tracking engine 241 may update a profile, store information, confirm that a consumer's account has the number of affinity points such consumer seeks to redeem in exchange for a reduction in the purchase price of a product/service, or perform any and all suitable actions for reducing the calculated distance between the consumer's profile and the advertiser's ideal profile that is associated with the advertisement. In some embodiments, the tracking engine 241 may dynamically update the ideal profile that may have theretofore been generated by an advertiser to more closely match the consumer's profile. In some embodiments, the tracking engine 241 may maintain a self-organizing map (as understood in the art of artificial intelligence and/or computer science) or the like that can be used to calculate distances between consumer's profiles and advertiser's ideal profiles. In response to the communication, the tracking engine 241 may update the self-organizing map so that the distance between the consumer's profile and the advertiser's ideal profile is reduced. In some embodiments, the dynamic matching engine 222 may utilize the self-organizing map or the like to calculate the distance between consumer profiles and advertiser's ideal profiles. It will be understood that a variety of embodiments of the tracking engine are possible.

In some embodiments, the databases 242 may store information relating to consumers, advertisers, and publishers. Profiles may be stored as attributes of individual consumers and advertisement campaigns. Rules may be stored as attributes of advertisement campaigns.

The advertiser database 244 may receive, store, and/or provide advertisements. The advertisements may be associated with advertisement campaigns, which may also be received, stored, and/or provided by the advertiser database 244. It will be understood that a variety of embodiments of the advertiser database 244 are possible.

The profile database 248 may receive, store, and/or provide consumers' profiles and ideal profiles. It will be understood that a variety of embodiments of the profile database 248 are possible.

The questions database 250 may receive, store, and/or provide the questions, a survey or part of a survey containing the questions, and so on. In some embodiments, the questions may be organized into one or more sets of questions. It will be understood that a variety of embodiments of the questions database 250 are possible.

The rules database 252 may receive, store, and/or provide business rules. In some embodiments, the rules may be associated with advertising campaigns, publishers, and so on. For example and without limitation, the rules may relate to how and when an advertising campaign may be run; how, when, and by whom a publisher's media may be utilized, a contractual arrangement between an advertiser and a publisher, and so on. A variety of rules will be appreciated. It will be understood that a variety of embodiments of the rules database 252 are possible.

In some embodiments the ABDAT 102 may include a system for distributing a constrained set of counters over answers to a constrained set of questions. The counters may be consumed according to a function when the counters are distributed. As may be described in detail hereinafter with reference to FIG. 8 and elsewhere, at least one of the user interfaces 202 may be adapted both to present the constrained set of questions and to receive an indication of how to distribute the counters over answers. The questions database 250 may communicate questions to at least one of the user interfaces 202. This user interface 202 may enable or be associated with communication of the indication to the profile database 248, which may receive and store the indication. In some embodiments, at least one of the answers may be represented on a spectrum. In some embodiments, the spectrum may comprise a non-linear distance function that specifies a number of counters (as may be represented by tokens) consumed for an answer relative to a neutral answer on the spectrum.

In some embodiments the ABDAT 102 may include a system for measuring a distance between consumers' responses and ideal responses. The responses may be produced when a constrained set of counters is distributed over answers to a constrained set of questions. The counters may be consumed according to a function when the counters are distributed. The system may include the dynamic matching engine 222 and the profile database 248.

By now it should be appreciated that the consumer's profile may include a set of responses expressly provided by a consumer in response to questions. Similarly, it should be appreciated that each of the ideal profiles may include a set of responses expressly provided by an advertiser in response to the same questions. Throughout this disclosure, the phrases "advertiser's ideal profile" and "ideal profile" may be used interchangeably, except where otherwise explicitly stated or clear from the context. However, some embodiments of the present invention may employ ideal profiles that are produced by and/or associated with an entity other than an advertiser. Therefore, embodiments of the present invention are in no way limited to ideal profiles that are advertiser's ideal profiles.

Figure 3:
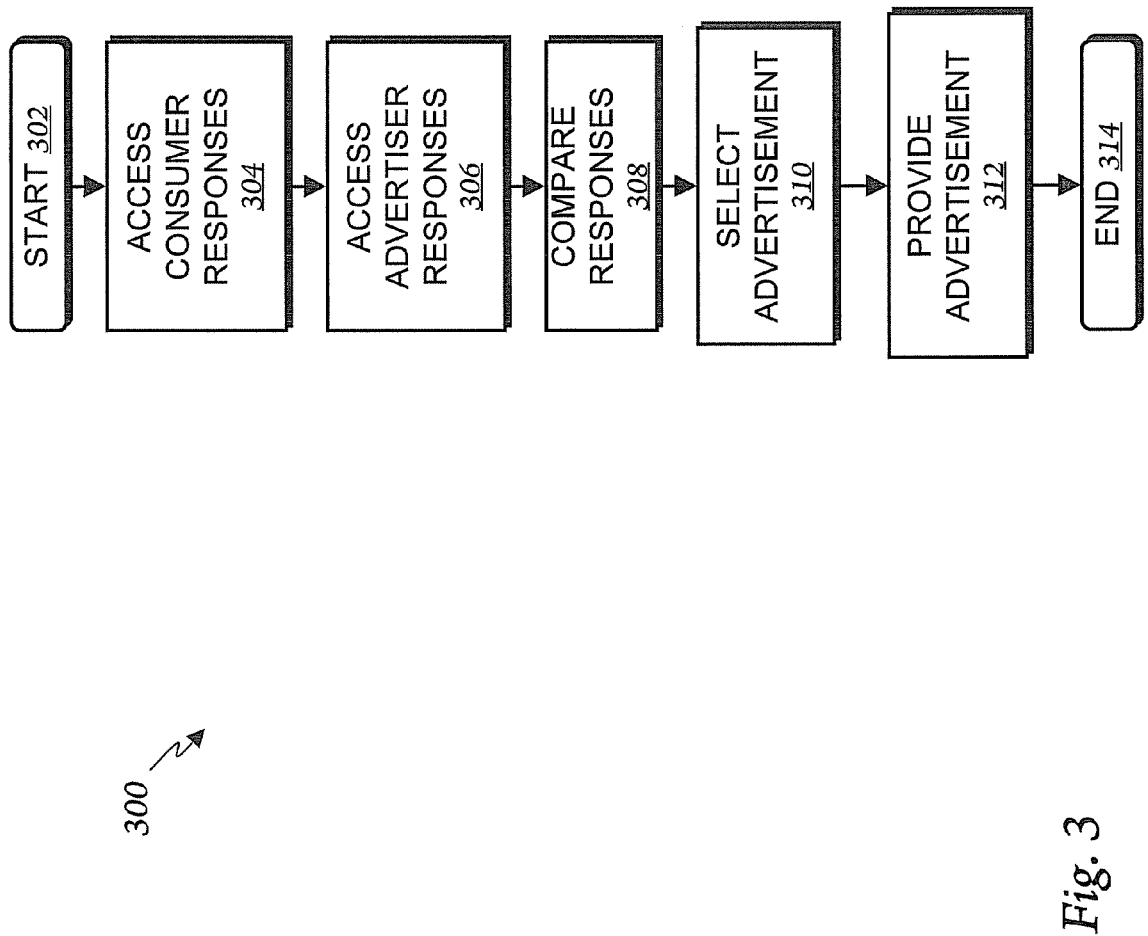
FIG. 3 depicts a method of providing an affinity-based digital ad targeting solution.

FIG. 3 depicts a method 300 of providing an affinity-based digital ad targeting solution. Step 304 may show that an application 220 accesses the consumer's profile from the profile database 248. Likewise, in step 306 an application 220 may access one or more ideal profiles from a database 242. Then, as shown in step 308, an application 220 may make a comparison between the consumer's profile and the one or more ideal profiles. As a result of the comparison in step 308, each of the consumers may be placed into a fit band for each of the ideal profiles.

Based upon the placement of consumers into fit bands, an application 220 may select one of a plurality of advertisements as shown in step 310. In some embodiments, selecting one of the advertisements may involve first selecting the advertising campaign and then selecting an advertisement within the campaign. In any case, selecting an advertisement or advertising campaign may include finding an ideal profile that, of any and all ideal profiles, is the nearest neighbor (that is, the closest fit) to the consumer's profile. In other words, selecting the advertisement or advertising campaign may include finding that advertisement or advertising campaign in which the consumer's profile is placed in the highest-ranked fit band. The nearest-neighbor ideal profile may be associated with an advertisement or advertising campaign, which becomes the selected advertisement or advertising campaign in step 310. Finally, that advertisement may be provided to the user as indicated in step 312.

In preferred embodiments, an application 220 may select one or more advertisement modules as shown in step 310.

In some embodiments, the step 312 of providing the advertisement to the user may include signaling the ad server 104 to provide the advertisement; providing the advertisement directly, signaling an interface 202 to provide the advertisement; signaling a client 110 to provide, redirect, pop-up or otherwise display the advertisement; and so on. It will be understood that a variety of embodiments of providing the advertisement are possible.

Figure 4:
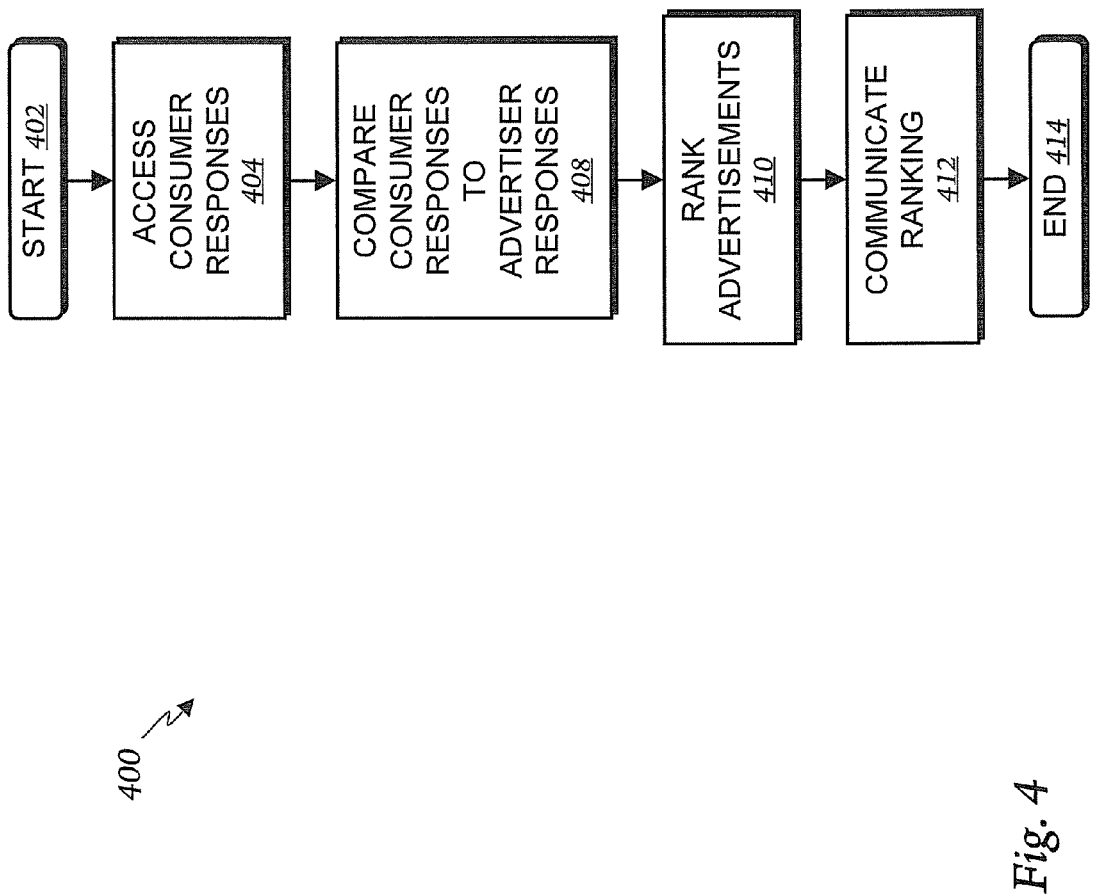
FIG. 4 depicts a method of providing an affinity-based digital ad targeting solution.

FIG. 4 depicts a method 400 of providing an affinity-based digital ad targeting solution. Step 404 may show that an application 220 accesses the consumer's profile from the profile database 248. Then, as shown in step 408, an application 220 may make a comparison between the consumer's profile and one or more ideal advertiser profiles.

Each of the one or more ideal advertiser profiles may be associated with an advertisement. Based at least in part upon the comparison in step 408, an application 220 may rank the plurality of advertisements as shown in step 410. In some embodiments, the ranking may be correlated to a degree of fit between the consumer's profile and each of the ideal advertiser profiles associated with the advertisements.

Finally, an application 220 may communicate the ranking as shown in step 412. In some embodiments, the ranking may be communicated to one of the databases 242 for storage. In some embodiments, the ranking may be communicated to one of the interfaces 202, which may in turn display the ranking.

In some embodiments, at least one of the questions is a question for psychographic profiling of a user. In some embodiments, the consumer in return for compensation may expressly provide responses to questions. In some embodiments, the compensation may include affinity points. In some embodiments the responses may include a distribution of a constrained set of counters over answers to a constrained set of questions. In some embodiments, comparing the responses may include applying a distance function that calculates a distance or fit between the responses. In some embodiments, the method 400 may further include providing a varying amount of affinity points to the consumer for providing at least one of the responses in the consumer's profile. For example and without limitation, some responses, questions, or types of responses or questions may be associated with providing more affinity points than other responses, questions, or types of responses or questions. As described hereinabove and elsewhere, the points may be redeemable for a benefit to the consumer, including without limitation for a service, a product, and so on.

Figure 5:
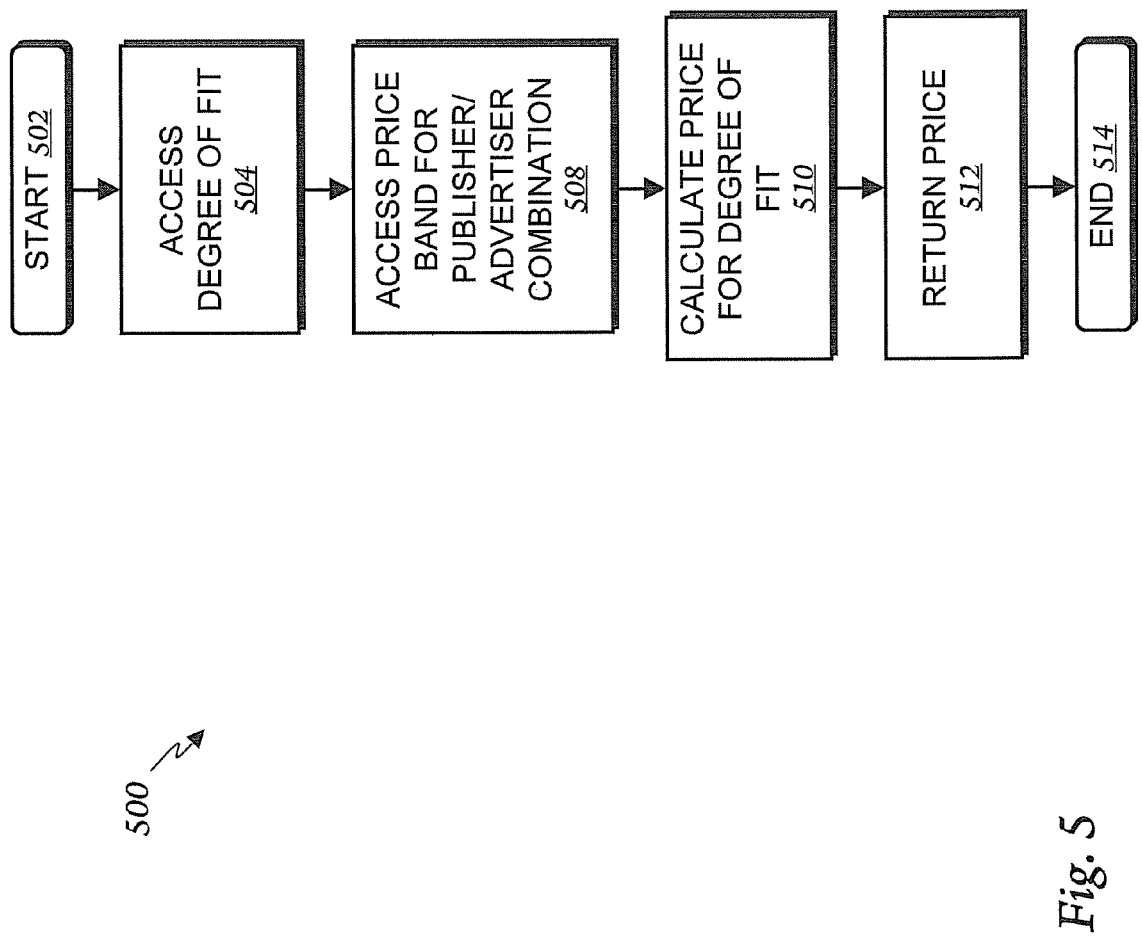
FIG. 5 depicts a method of pricing advertising offers.

FIG. 5 depicts a method 500 of pricing advertising offers. Step 502 may show that an application 220 accesses a degree of fit from a database 242. Then, as shown in step 508, the application 220 may access a database 242 to retrieve prices associated with degrees of fit for a publisher/advertiser combination. The application 220 may then select one of the prices, the prices associated with the degree of fit, as shown in step 510. Finally, the application 220 may return the price according to step 514.

In some embodiments, returning the price may include communicating the price to one of the databases 242 for storage. In some embodiments, returning the price may include communicating the price to one of the interfaces 202, which may in turn display the ranking and/or applicable fit band.

It should be understood that each of the degrees of fit might have resulted from a comparison between an advertiser's ideal profile and a consumer's profile. Furthermore, it should be understood that the ideal profile might be associated with an advertisement or advertising campaign. Thus, an application 220 may calculate a price for the advertisement by first making a comparison to determine a degree of fit and then looking up a price that is associated with the degree of fit for a publisher/advertiser combination. In some embodiments, the price may include a CPC, CPA, or the like.

Figure 6:
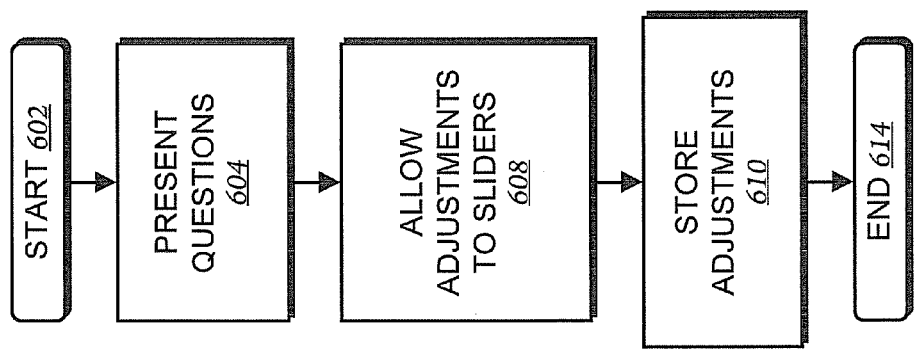
FIG. 6 depicts a method of an affinity-based digital ad targeting solution.

FIG. 6 depicts a method 600 of an affinity-based digital ad targeting solution. As shown in step 604, an interface 202 may present a constrained question set to a consumer. In some embodiments, the question set may be chosen based upon the consumer's profile or previously-known components thereof. As will be seen hereinafter with reference to FIG. 8 and elsewhere, each of the questions in the question set may be associated with a slider or the like. The interface 202 may allow the consumer to make adjustments to each of the sliders (step 608). When or after the adjustments are made, the adjustments may be stored (step 610).

In some embodiments, storing the adjustments may include the interface 202 communicating the adjustments to an application 220, which in turn communicates the adjustments to a database 242, which stores the adjustments. In some embodiments, storing the adjustments may include the interface 202 communicating the adjustments to the database 242, which stores the adjustments.

The adjustments may signify answers to the questions and may be captured or reflected in a profile. In some embodiments, the profile may include a psychographic profile. In some embodiments, the sliders may be constrained to allow only a limited cumulative departure from neutral answers in the question set. In other words, adjusting the sliders may be tantamount to distributing a finite number of tokens over answers as described herein and elsewhere.

In some embodiments, the method 600 may further include providing a varying amount of affinity points to the consumer for providing at least one of the responses in the consumer's profile. As described hereinabove and elsewhere, the points may be redeemable for a benefit to the consumer, including without limitation for a service, a product, and so on.

Figure 7:
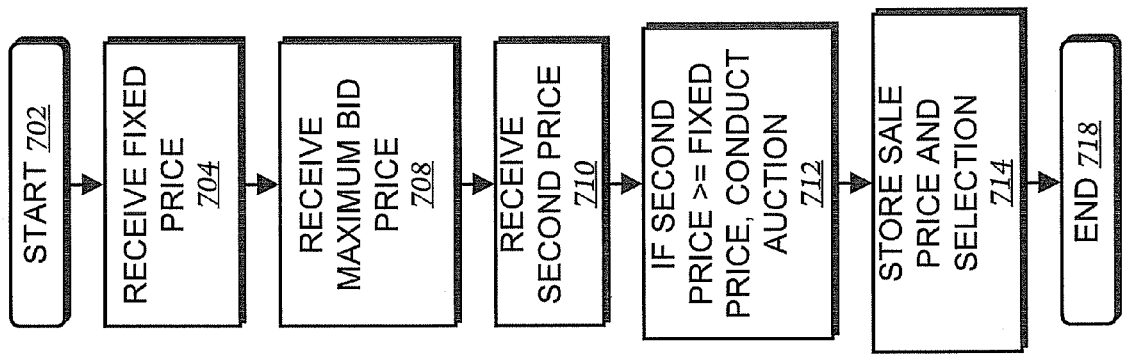
FIG. 7 depicts a method of pricing advertising offers.

FIG. 7 depicts a method 700 of pricing advertising offers. Step 704 may show that an application 200 receives a fixed price for a first advertisement or advertisement module. Step 708 may show that the application 200 receives a maximum bid price for the first advertisement or advertisement module. Step 710 may show that the application 200 receives a second price for a second advertisement or advertisement module. In some embodiments, each of the first advertisement or advertisement module and the second advertisement or advertisement module may be associated with an advertiser's ideal profile that is of substantially similar fit to all or part of a consumer's profile. In any case, when the second price is greater than or equal to the fixed price, an auction may be conducted as shown by step 712.

The auction may pit a bid of the maximum bid price against a bid of the second price. Typically, with respect to a plurality of ads whose associated ideal profiles fall within the same fit band relative to a particular consumer profile, the bid having the greater price will be deemed the winner. Depending upon the type of auction employed, the winner may be assigned a sale price that is the highest of the two bids, the lowest of the two bids, a value in between the two bids, or the like. In any case, the auction may make a selection, the selection being that advertisement or advertisement module associated with the winning bid.

Finally, the method 700 may store the sale price and the winning bid. In some embodiments, storing may include communicating information to one or more of the databases 242, communicating information to one or more of the interfaces 202, communicating information to the ad server 104, and so on.

In preferred embodiments, the method 700 may operate substantially in real time. In preferred embodiments, the consumer may be using a client 110 or the like that is capable of receiving an advertisement substantially in real time. Thus, as the consumer reaches web pages or the like in which advertising may be presented, the method 700 may be invoked in order to configure, select, and price an advertisement for presentment to the consumer.

Without limitation, advertisement creative modules may include various forms of advertising copy including copy featuring a variety of makes, models, features, or the like of a product; background scenery; dealership information; voiceovers; music; text; and so on. It will be understood that a variety of embodiments of advertisement modules are possible.

In preferred embodiments, the method for selecting modules for inclusion in the advertisement may select modules so as to create an advertisement that most closely fits a consumer's profile. Then the consumer's profile may be placed into a fit band relative to an ideal profile associated with the advertisement. The ideal profile may be a function of the modules selected for inclusion in the advertisement. In any case, after the fit band is determined a price may be selected according to any and all suitable methods described herein and elsewhere including without limitation methods described in association with the dynamic pricing engine 224, the method described herein with reference to FIG. 5, the method described herein with reference to FIG. 7, or the like.

In some embodiments, a plurality of advertisement modules may be selected in order to create, in aggregate, an advertisement having the tightest possible fit to a consumer's profile. In such embodiments, the process 700 may be invoked on a module-by-module basis when a variety of modules are suitable for inclusion in an advertisement and therefore there is contention between modules. In preferred embodiments, however, some other method may be employed to select modules for inclusion in the advertisement, and when such advertisement is one of a plurality of suitable advertisements the method 700 may be invoked to select and price one of the plurality of advertisements.

For example and without limitation, a producer of an advertisement circular may from time to time send the circular to a set of consumers. Those consumers may opt-out of the list at any time, so it is important that the circular contain relevant advertisement messages to keep the consumers interested and engaged. So although the producer clearly has a short-term interest in maximizing the cost of every message, the producer also has a long-term interest in delivering messages with the tightest possible fit to the consumers. With respect to the long-term interest, the advertiser may assemble the advertisement circular from modules that, in aggregate, create the tightest possible fit to a consumer profile. When there are more modules available than can be included in the circular, and when those modules would provide an equally good fit no matter which of them were chosen, then an auction process may be invoked to determine which modules will be chosen. In this case, each of the modules involved in the auction may have costs associated with one or more fit bands—just as advertisements described herein and elsewhere may have costs associated with one or more fit bands.

Figure 8:
FIG. 8 depicts a profiler interface.

FIG. 8 depicts a profiler interface. The profiler interface 204 may include a region in which a consumer's demographic profile may be entered. As depicted, the demographic profile may without limitation include gender, age, income, family size, education, occupation, marital status, number and age of children in family, and so on.

The profiler interface 204 may include a region in which a consumer's geographic profile may be entered. As depicted, the geographic profile may without limitation include home postal code, work postal code, and so on.

The profiler interface 204 may include a region in which a consumer psychographic profile may be entered. As depicted, this region may include a plurality of sliders, each of which is associated with a statement (also referred to herein and elsewhere as a "question") and a range of answers. It will be appreciated that by adjusting a slider one may indicate an affinity or aversion in response to the statement associated with the slider.

In some embodiments, the profiler interface 204 may depict a number of tokens remaining and how many tokens have been consumed in entering or adjusting the sliders. It will be understood that a variety of embodiments of the slider and alternatives thereof are possible.

Figure 9A:
FIG. 9A depicts a director interface.

FIG. 9A depicts a director interface. The director interface 208 may include a section for entering demographic targeting filters, a section for selecting geographic targeting filters, and a section for selecting and weighing psychographic targeting attributes. Setting or modifying any and all of the filters and attributes may create or modify an ideal profile. In preferred embodiments, an advertiser may utilize the director interface to create the ideal profile.

The director interface may show a selection of users or types of users and the degree of fit between those user's profiles and the ideal profile defined by the filters and attributes.

FIG. 9 depicts a director interface. The director interface 208 may include a region in which business rules may be entered. In embodiments the director interface 208 may include a region in which an advertiser creates the ideal advertiser profile associated with a given ad creative module or modules within an ad campaign. As depicted, the business rules may without limitation include length of ad campaign, maximum advertisements served, daypart/weekpart, frequency caps, preferred distribution device(s), economic model, whether and how mash-ups are enabled, required or preferred websites on which advertisements may be placed, whether and how dynamic/customized advertisements are enabled, what ad modules are available for the dynamic/customized advertisements, and a plurality of fit bands and associated costs.

The director interface 208 may also include maximum dynamic CPCs/CPAs associated with the fit bands. As depicted, each and every one of the fit bands may be associated with a checkbox. In some embodiments, the checkbox may be used to toggle on and off the maximum dynamic cost of a fit band.

Figure 10:
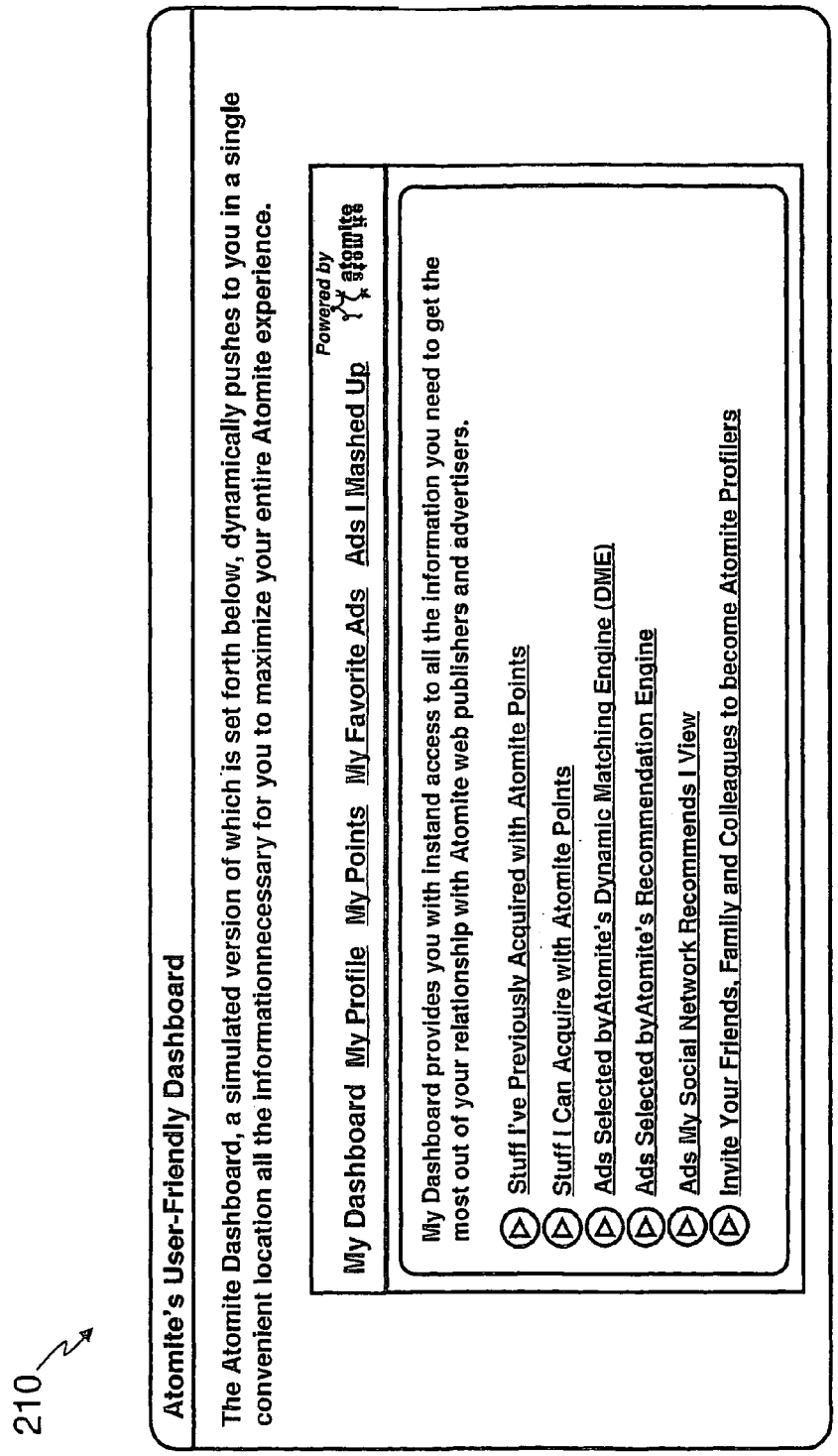
FIG. 10 depicts a consumer dashboard interface.

FIG. 10 depicts a consumer dashboard interface that enables a consumer to interact with one or more of the applications 220. The consumer dashboard interface 210 may include a number of tabs, buttons, or the like, the selection of which may initiate display of a page of information. As shown, the pages of information may relate to "my profile," "my points," "my favorite ads," "ads I mashed up," products/services a consumer can acquire in exchange for the redemption of affinity points, and so on. It will be understood that a variety of embodiments of the consumer dashboard interface 210 are possible.

Figure 11:
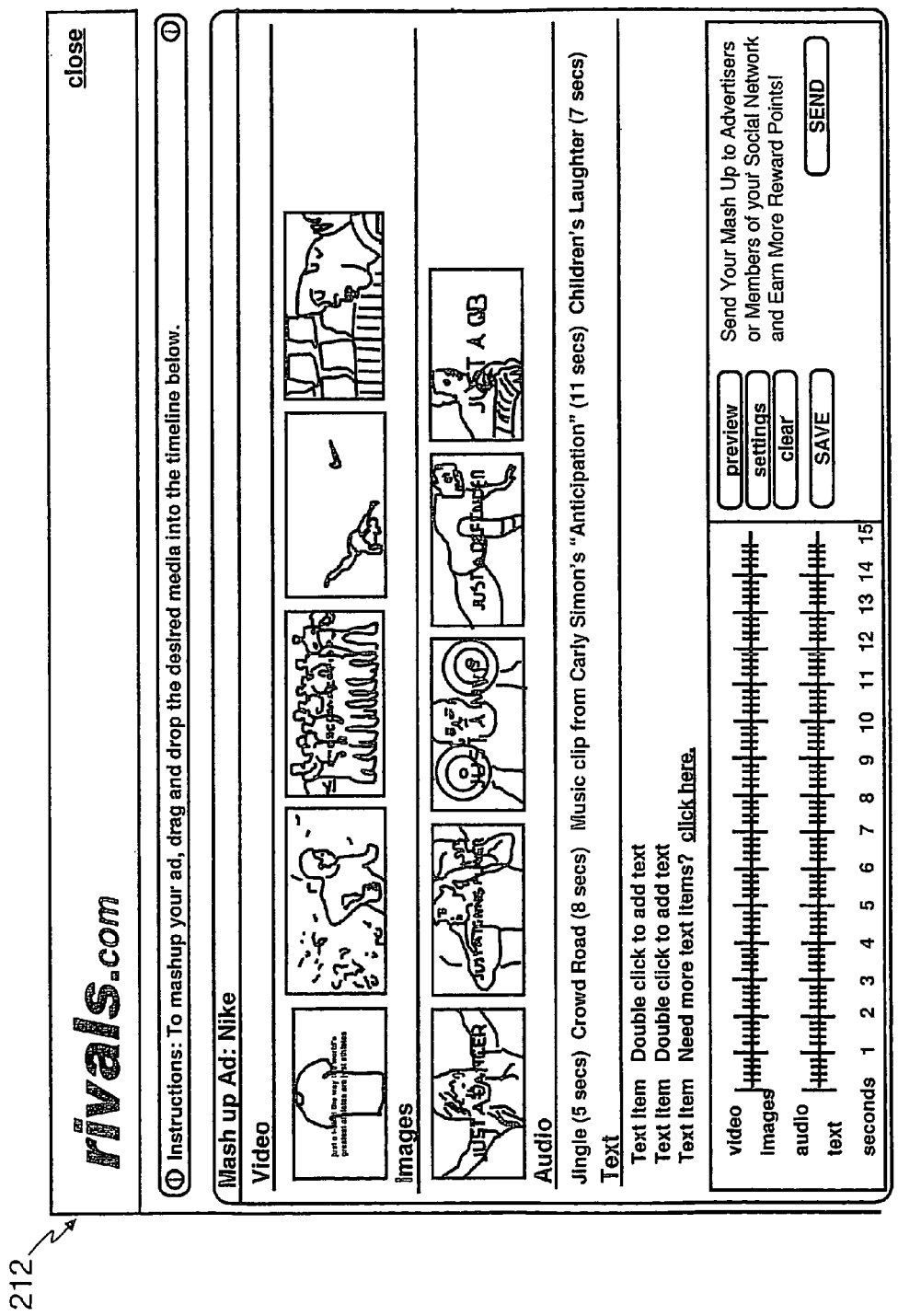
FIG. 11 depicts an ad mash-up tool interface.

FIG. 11 depicts an ad mash-up tool interface. The mash-up tool interface 212 may enable a plurality of advertisement creative components to be combined in a variety of ways to produce a so-called mashed-up advertisement. As shown, the mash-up tool may display and allow the selection of video components, image components, audio components, text components, and so on. Also as shown, the components may be placed on a timeline representing the advertisement's duration. In some embodiments, the creative components may include advertiser-provided content and/or user-generated content. It will be understood that a variety of embodiments of the mash-up tool interface are possible. Additionally, it should be appreciated that, in some embodiments, a user may be awarded affinity points or the like for creating an ad mash-up that is ultimately sanctioned and/or deployed by an advertiser.

Figure 12:
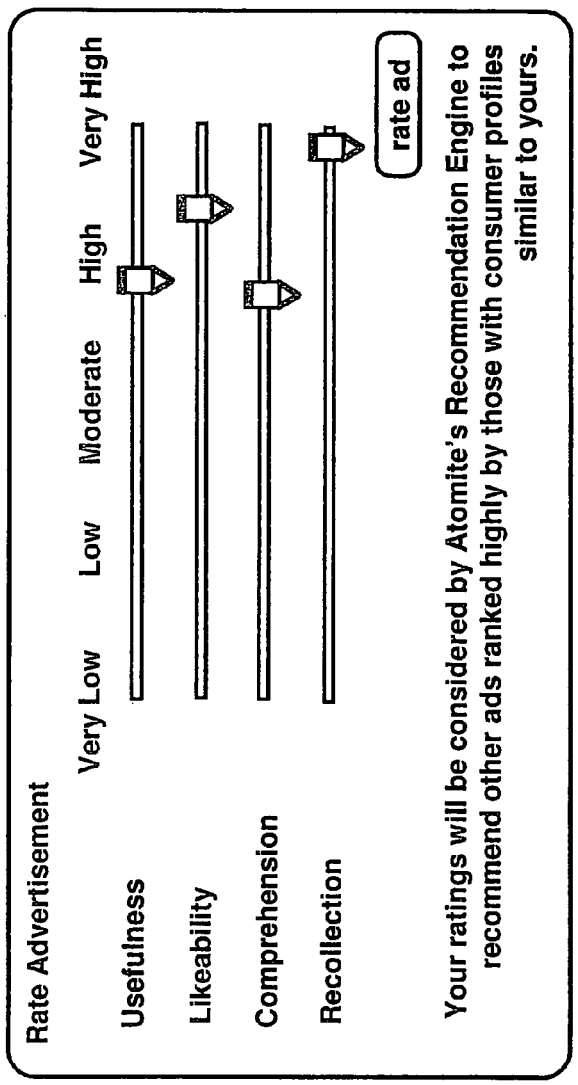
FIG. 12 depicts an ad rank tool interface.

FIG. 12 depicts an ad rank tool interface. The ad rank tool interface 214 may include a number of criteria against which an advertisement may be ranked. As shown, the criteria may include usefulness, likeability, comprehension, recollection, and so on. Also as shown, a user may rank an advertisement by adjusting sliders associated with the criteria. It should be appreciated that, in some embodiments, a user may be awarded affinity points or the like for adjusting the sliders. It will be understood that a variety of embodiments of the ad rank tool interface 214 are possible.

Figure 13:
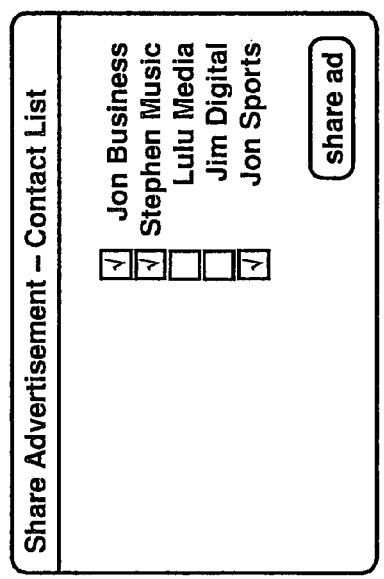
FIG. 13 depicts an ad share tool interface.

FIG. 13 depicts an ad share tool interface. The ad share tool interface 214 may include a contact list. A consumer may share an advertisement with other consumers in the contact list by selecting the consumers and then selecting the share ad button. In some embodiments, the consumer may be awarded affinity points for sharing the advertisement with other consumers. It will be understood that a variety of embodiments of the ad share tool interface 218 are possible.

Figure 14:
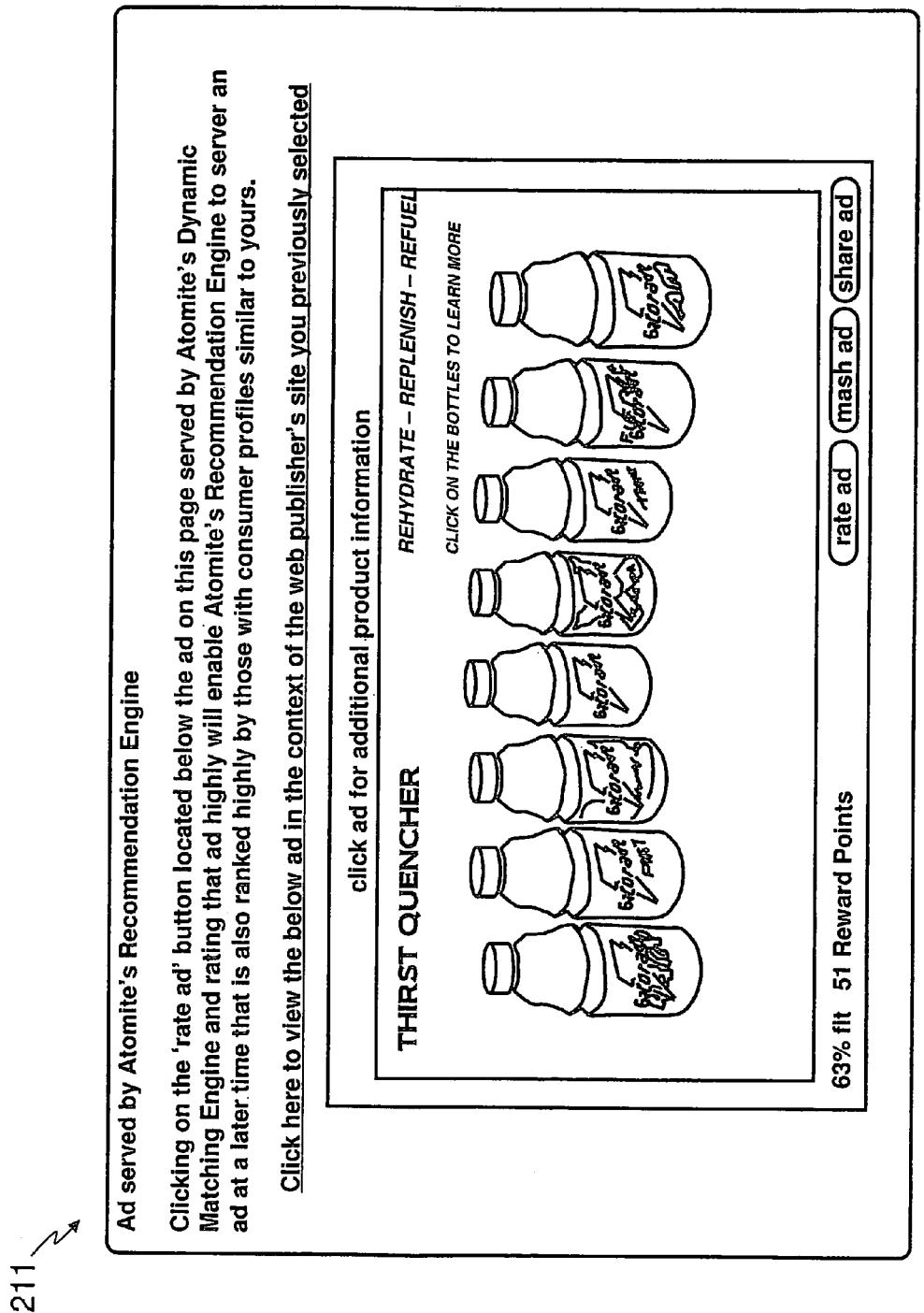
FIG. 14 depicts a peer recommendation interface.

FIG. 14 depicts a peer recommendation interface. The peer recommendation interface 211 may include a depiction of an advertisement, a rate ad button, a mash ad button, a share ad button, and so on. In some embodiments, the peer recommendation interface 211 may include a percent fit, a number of reward points, and so on. Selecting the rate ad button may activate a pop-up or the like in which a user may enter a rating or ratings. In preferred embodiments, entering the rating or ratings may involve adjusting one or more sliders or the like. Selecting the mash ad button may activate the mash-up tool interface 212. Selecting the share ad button may activate the ad share tool interface 214. The percent fit may indicate the percentage fit between the consumer and the ideal profile associated with the advertisement. The reward points may be the number of award points to be awarded to the consumer when such consumer clicks on the ad for additional product information or the like; when the consumer rates the ad, makes a mash-up of the ad, shares the ad, or the like; and so on. In preferred embodiments, a user who rates an ad in a particular way may later be served one or more advertisements that were rated in a similar way by one or more users who have consumer profiles that are similar to the user's profile. In some embodiments, an advertisement that is well rated by a first consumer may later be served to a second consumer who has a profile that is similar to the first consumer's profile.

Any and all of the elements of the ABDAT 102 may be implemented in hardware, software, or a combination thereof. In some embodiments, any and all of the interfaces 202, applications 220, and databases 242 may be operatively coupled to one another and/or may communicate with one another. In preferred embodiments, the interfaces 202 may be provided to a user via a web browser or other client program on a client 110. In preferred embodiments, the applications 220 may include software operating on one or more servers (such as and without limitation a suitable rack-mount server, blade server, or the like). In some embodiments, the applications 220 may include software operating on a client 110 or other computer. In preferred embodiments, the databases may include a relational database management system operating on one or more servers. In some embodiments the servers may be co-located at a datacenter, distributed across a plurality of datacenters, and so on.

The depicted elements may be shown with respect to logical boundaries that enable understanding of embodiments of the present invention. In some embodiments and according to software engineering practice, some or all of these logical boundaries may not actually be present. For example and without limitation, in some embodiments an application 220 and an interface 202 may exist together in a single, monolithic program. So, although the depiction may suggest a particular arrangement of elements into software and/or hardware modules, embodiments of the present invention are not limited to such an arrangement. Moreover, although the depiction may suggest a three-tier architecture, it will be understood that a variety of architectures are possible and that embodiments of the present invention are in no way limited to three-tier architectures. For example, it will be understood that in some embodiments the elements depicted in FIG. 2 need not be instantiated in the same computer, at the same place, at the same time, and so on.

Unless otherwise stated or clear from the context, throughout this disclosure the word "question" should be interpreted as "question, statement, consumer survey question, or the like."

In some embodiments any and all of the elements depicted in FIG. 2 may exist within the same or different administrative domains. For example and without limitation, in some embodiments the questions database 250 may be licensed from a third party and may exist in an administrative domain of the third party. In such embodiments, the questions database 250 may be subject to access control administered by the third party. A variety of such examples will be readily appreciated.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and descriptions set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

The invention claimed is:

1. A digital ad targeting system, the system configured to process expressly provided profiles of and relating to consumers and profiles associated with advertisements, the system comprising:
 a first user interface configured to receive the profiles associated with the advertisements, wherein a profile associated with an advertisement comprises responses to a first set of questions;

a second user interface configured to receive the expressly provided profiles of and relating to the consumers, wherein an expressly provided profile for a consumer comprises responses to a second set of questions, and wherein a first set of responses to the first set of questions and a second set of responses to the second set of questions comprise answers to identical questions and a distribution of a constrained set of tokens over answers to a constrained set of questions;

at least one database configured to store the expressly provided profiles of and relating to the consumers and profiles associated with advertisements;

a third user interface configured to display an advertisement; and at least one computer comprising at least one application in communication with the first user interface, the second user interface, the third user interface, and the at least one database via a network, the at least one application comprising a dynamic matching engine configured to:

compare the expressly provided profiles of and relating to the consumers to the profiles associated with the advertisements; and select the advertisement for delivery to the consumer based on a closest fit, wherein the closest fit is a function of variance between each answer of the pair of answers to identical questions comprising the expressly provided profile for the consumer and the profile associated with the advertisement and accumulating variances between the pair of answers to identical questions, with the absolute value of the variances determined by using a distance function of a type selected from the group consisting of linear, non-linear, symmetrical, non-symmetrical, continuous and discrete;

wherein the at least one application provides points to the consumer in exchange for the consumer taking at least one action, the at least one action comprising at least one of the following: creating the profiles of and relating to consumers, updating the profiles of and relating to consumers, providing at least one response, inviting another consumer to create a profile of and relating to a consumer, allowing association of third-party data with the profiles of and relating to consumers, granting permission to share information with a third-party, ranking at least one advertisement, sharing at least one advertisement, mashing at least one advertisement, clicking on at least one advertisement, or any combination thereof, and wherein the points are exchangeable by the consumer for at least one benefit to the consumer, and wherein the at least one application is configured to protect against fraudulent accumulation of points by determining fraudulent accumulation of points based at least partially on statistical outliers of at least one of action or inaction by the consumer within the specified period of time relative to at least one of action or inaction of other consumers with the expressly provided profiles having at least one common attribute, and by issuing a warning to a potential fraudulent consumer.

2. The system of claim 1, further comprising an ad server in communication with the at least one application for delivering at least one advertisement to the consumer via the network.

3. The system of claim 1, wherein the second user interface is a profiler interface and the expressly provided profile includes at least one of the following: demographic profile, geographic profile, psychographic profile, or any combination thereof.

4. The system of claim 1, wherein the first user interface is a director interface for receiving the profiles associated with the advertisements.

5. The system of claim 1, further comprising a consumer dashboard interface in communication with the at least one application for providing access to the at least one application to the consumer.

6. The system of claim 1, wherein the points are provided to the consumer based at least partially on the degree of fit between the expressly provided profile of and relating to the consumer and the profile associated with an advertisement.

7. The system of claim 1, wherein the at least one application includes a reporting engine for generating reports, and the reports include at least one of the following: billing statements for advertisers, consumer profile data, market data, advertising performance, or any combination thereof.

8. The system of claim 1, wherein the at least one application prevents fraudulent accumulation of points based on a business rule that prevents the accumulation of points for specific consumers.

9. The system of claim 1, wherein the at least one application prevents fraud by flagging the potential fraudulent consumer and preventing redemption of at least a portion of the points.

10. The system of claim 1, wherein the at least one application includes a business rules engine as an interface between an operator of the digital ad targeting system and advertisers, the business rules engine is configured to enforce at least one business rule between the operator of the digital ad targeting system and the advertisers.

11. The system of claim 10, wherein the business rules engine is configured to enforce a business rule that requires the selected advertisement to be delivered to the consumer to result in the highest cost-per-click or cost-per-action.

12. The system of claim 1, wherein the at least one database includes an advertiser database in communication with the at least one application configured to perform at least one of: receive advertisements, store advertisements, provide advertisements, serve advertisements, or any combination thereof.

13. The system of claim 1, further comprising a web browser in communication with the at least one application via the network for causing the third user interface to display the advertisement to the consumer.

14. The system of claim 1, wherein the at least one database includes a questions database in communication with the at least one application configured to perform at least one of: receive at least one question, store at least one question, provide at least one question, or any combination thereof, and the questions database is configured to communicate the at least one question to at least one user interface.

15. The system of claim 1, wherein the at least one database includes a rules database in communication with the at least one application configured to perform at least one of: receive business rules associated with advertising campaigns, store business rules associated with advertising campaigns, provide business rules associated with advertising campaigns, deploy business rules associated with advertising campaigns, or any combination thereof.

16. The system of claim 1, wherein the at least one application comprises a tracking engine for receiving a communication from the third user interface after the consumer responds to the advertisement.

17. The system of claim 16, wherein the tracking engine updates at least one of the profile associated with an advertisement or the expressly provided profile of and relating to a consumer, such that a closer fit exists between the profile associated with the advertisement and the expressly provided profile of and relating to the consumer.

18. The system of claim 1, further comprising a web browser in communication with the at least one application via the network for providing at least one user interface to at least one user.

19. The system of claim 1, further comprising a client application in communication with the at least one application via the network for providing at least one user interface to at least one user.

* * * * *